United States Patent [19]

Yamauchi et al.

[11] Patent Number: 5,020,625
[45] Date of Patent: Jun. 4, 1991

[54] MOTOR BICYCLE PROVIDED WITH ARTICLE ACCOMMODATING APPARATUS

[75] Inventors: Kosaku Yamauchi, Shizuoka; Akihiko Muramatsu; Shinji Kaku, both of Hamamatsu, all of Japan

[73] Assignee: Suzuki Jidosha Kogyo Kabushiki Kaisha, Shizuoka, Japan

[21] Appl. No.: 402,194

[22] Filed: Sep. 1, 1989

[30] Foreign Application Priority Data

| Sep. 6, 1988 | [JP] | Japan | 63-221454 |
| Sep. 6, 1988 | [JP] | Japan | 63-221455 |
| Sep. 7, 1988 | [JP] | Japan | 63-222284 |
| Sep. 28, 1988 | [JP] | Japan | 63-240654 |
| Sep. 29, 1988 | [JP] | Japan | 63-242564 |
| Dec. 22, 1988 | [JP] | Japan | 63-322182 |
| Feb. 10, 1989 | [JP] | Japan | 1-31921 |
| Feb. 10, 1989 | [JP] | Japan | 1-31922 |
| Mar. 20, 1989 | [JP] | Japan | 1-65893 |

[51] Int. Cl.$^5$ .................................. B62K 11/00
[52] U.S. Cl. ...................... 180/219; 70/241; 296/180.1; 296/37.1
[58] Field of Search ............ 180/219, 68.1, 229; 297/352, 195, 375; 224/32 R, 32 A, 30 R, 30 A, 315, 328, 902; 280/202, 288.4, 290; 296/180.1, 37.1, 208, 211; 70/240, 241, 256, 257

[56] References Cited

U.S. PATENT DOCUMENTS

| 3,328,074 | 6/1967 | Rossem | 296/180.1 |
| 3,643,479 | 2/1972 | Solow | 70/241 |
| 3,910,623 | 10/1975 | McKeen | 296/180.1 |
| 4,416,348 | 11/1983 | Fukui | 180/68.1 |
| 4,577,720 | 3/1986 | Hamane et al. | 180/229 |
| 4,595,903 | 6/1986 | Arlasky et al. | 70/241 |
| 4,723,620 | 2/1988 | Ono | 180/219 |
| 4,802,682 | 2/1989 | Yasuji | 180/219 |
| 4,895,284 | 1/1990 | Nogami et al. | 296/37.1 |
| 4,907,428 | 3/1990 | Nakashima et al. | 180/219 |
| 4,911,494 | 3/1990 | Imai et al. | 296/208 |

FOREIGN PATENT DOCUMENTS

| 0299524 | 1/1989 | European Pat. Off. | 180/219 |
| 0303408 | 2/1989 | European Pat. Off. | 180/219 |
| 2546857 | 4/1977 | Fed. Rep. of Germany | 296/211 |
| 3822732 | 1/1989 | Fed. Rep. of Germany | 180/219 |
| 2184990 | 7/1987 | United Kingdom | 180/219 |

*Primary Examiner*—Charles A. Marmor
*Assistant Examiner*—A. M. Boehler
*Attorney, Agent, or Firm*—Schwartz & Weinrieb

[57] ABSTRACT

A motor bicycle is provided with an article accommodating box for a helmet which is disposed above an upper portion of an engine unit. The article box is provided with a bottom portion extending rearwardly along the upper portion of an intake system connected to the engine unit and the front portion of the bottom portion rises upwardly at the upper rear portion of the engine cylinder head. The box is provided with a cover having an improved solar heat insulation structure by forming an air passage within an upper portion of the cover. The box is further provided with a ventilation member for air circulation within the interior of the box. The box is locked by means of a locking mechanism which is provided with a device for preventing the box cover from being erroneously locked or unlocked. The motor bicycle may be provided with an additional article accommodating box for an extra helmet at a location defined by means of a space between the head pipe, the cowling and the front fork.

37 Claims, 17 Drawing Sheets

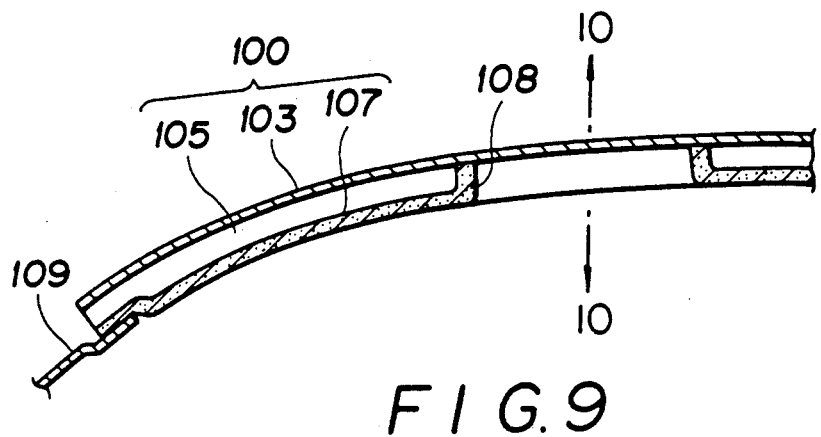
FIG.9
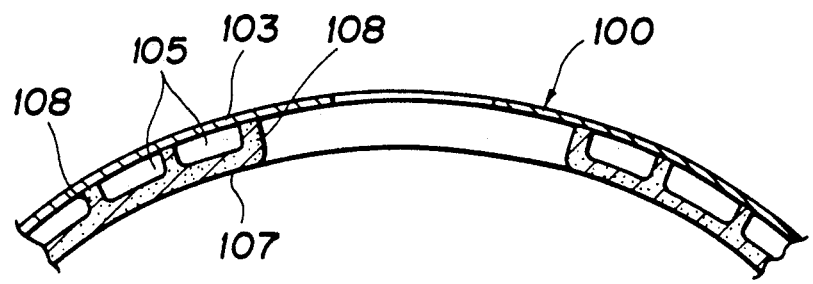
FIG.10
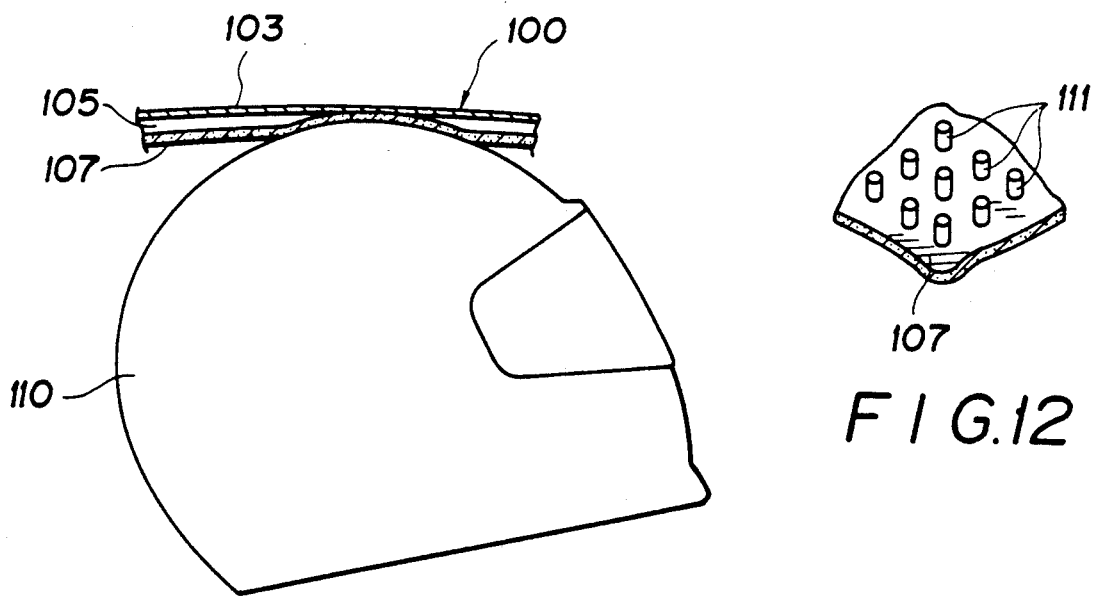
FIG.11
FIG.12

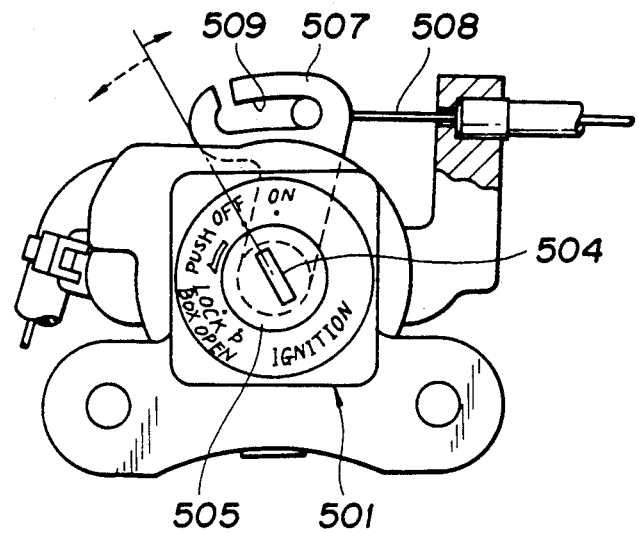
FIG. 31
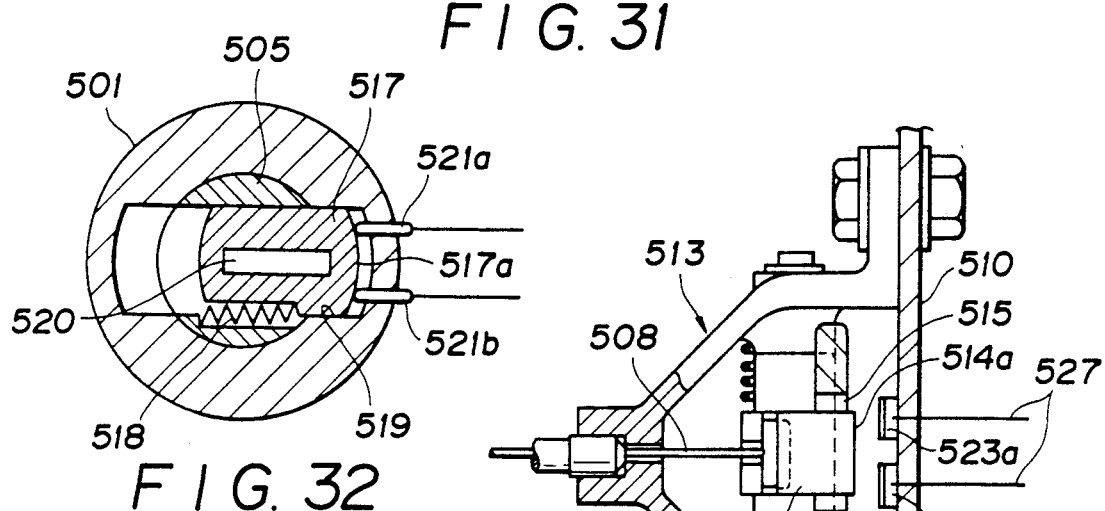
FIG. 32
FIG. 34
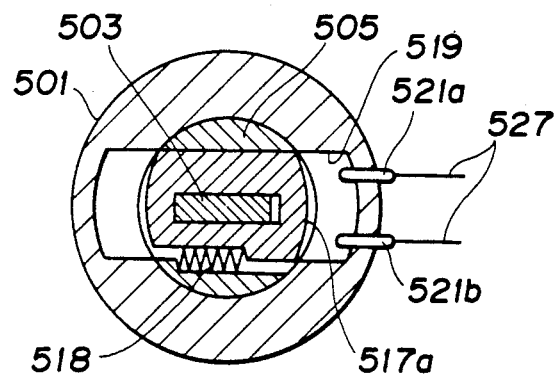
FIG. 33

MOTOR BICYCLE PROVIDED WITH ARTICLE ACCOMMODATING APPARATUS

FIELD OF THE INVENTION

This invention relates to a motor bicycle and more particularly to an apparatus for accommodating an article having a relatively large volume such as, for example, a helmet for a rider of the motor bicycle.

BACKGROUND OF THE INVENTION

It is necessary for a rider of a motor bicycle to wear a helmet when he drives the motor bicycle and, accordingly, it is also required to provide a space for safely keeping the helmet when he leaves the motor bicycle. In order to satisfy this requirement, there has been proposed a motor bicycle provided with a helmet accommodating box at a location above the engine unit and disposed in substantially the central portion of the motor bicycle body. For this arrangement, a fuel tank, which usually occupies this location, is displaced to another location such as, for example, a location disposed beneath the rider's.

According to this arrangement, however, the distance defined between the upper portion of the cover for the article accommodating box and the ground is increased for the reason that the article accommodating box has no degree of freedom in connection with the design thereof in comparison with that of the fuel tank and, hence, this particular location of the motor bicycle exhibits a relatively large height in the vertical direction. This increase in height also adversely affects the riding position of the rider. This problem is not so significant for a motor bicycle equipped with a V-type engine in which the height of the cylinder head can be designed to be relatively low or a motor bicycle equipped with a horizontally opposed two-cycle engine or a motor bicycle equipped with a vertical type two-cycle engine. However, the problem is significant for a vertical four-cycle engine utilizing cylinder heads each having a large volume. In addition, according to the described arrangement of the article accommodating box, the box is located above the cylinder head which is generally heated to a relatively high temperature and the article accommodating box is liable to be heated to a high temperature by means of the radiant heat from the cylinder head. The fact that the helmet accommodating box is highly heated adversely affects the helmet or other articles accommodated within the box. In order to obviate this problem, it may be possible to locate the article accommodating box at a position rearwardly of the cylinder head. This arrangement, however, affects the arrangement of the seat, and a reduction of the seating area of the seat due to the outer configuration and the large volume of the accommodating box is inconvenient for the rider.

In accordance with another aspect of the drawbacks or disadvantages of the prior art as described above, with respect to the arrangement of the article accommodating box, the fuel tank can be displaced to a location, for example, below the seat. However, in a conventional arrangement, a battery or the like is located at this position, so that it is difficult to accomodate a fuel tank with sufficient volume below the seat.

In accordance with a further aspect of the difficulties of the prior art, the article accommodating box is usually covered by means of a cover which is generally made of a metallic material, and which is thereford relatively easily heated to a high temperature by, for example, means of solar heat. The fact that the cover is heated to a high temperature adversely affects the helmet or the other articles accommodated within the accommodating box. In order to obviate this defect, it may be conceived to dispose a heat insulating material upon an inner surface of the cover. However, it is necessary for the heat insulating material to have a relatively large thickness for attaining a sufficient heat insulating effect. This fact results in increasing the volume or weight of the cover as well as increasing the manufacturing cost thereof. The volume of the accommodating box may also be correspondingly enlarged, which will finally affect the total layout or the design of the motor bicycle.

In accordance with the foregoing, therefore, the article accommodating box is generally provided with a ventilating hole for communication between the interior of the box and the atmosphere. The hole is generally open towards the advancing direction of the motor bicycle, so that during a rainy day rain drops may fall into the accommodating box through means of a horizontal passage of the ventilating hole during the travelling of the motor bicycle.

In accordance with a still further aspect of the prior art, it is required for the cover of the article accommodating box to be safely locked without failure and if the locking of the article accommodating box cover is not safely made, it is desired to inform the rider of this fact by any means.

In accordance with a still further aspect of the prior art, in a case where another person rides upon the motor bicycle, it is better for the motor bicycle to be equipped with an additional article accommodating box for accommodating a helmet for the other person when he leaves the motor bicycle.

OBJECTS OF THE INVENTION

An object of this invention is to eliminate or improve the defects or drawbacks encountered in the prior art and to provide a motor bicycle provided with an article accommodating apparatus which provides an improved arrangement of the main body of the motor bicycle and which provides a suitable space for locating an article accommodating box without substantially affecting the riding position of the rider.

Another object of this invention is to provide a motor bicycle provided with an improved article accommodating box particularly for accommodating a helmet for the rider having an improved heat insulating structure, air ventilation and cooling effects.

A further object of this invention is to provide a motor bicycle provided with an improved cover for an article accommodating box having an improved heat insulating structure, air ventilation and cooling effects.

A still further object of this invention is to provide a motor bicycle provided with an article accommodating box having a locking mechanism therefor for attaining a secure locking function without failure.

A still further object of this invention is to provide a motor bicycle provided with an additional article accommodating box in which an extra helmet can be accommodated by effectively utilizing a space defined within the main body portion of the motor bicycle.

SUMMARY OF THE INVENTION

These and other objects can be achieved according to this invention by providing a motor bicycle comprising a front wheel steered by means of handlebars connected to a head pipe, a main body equipped with an engine unit located at substantially a central portion of the main body and including multiple cylinders having cylinder heads and an intake system extending rearwardly from the cylinders of the engine unit, a seat for a rider located at a rearwardly upper portion of the main body, a rear wheel disposed below the seat and driven by means of the engine unit, and an article accommodating box provided with an openable cover and a locking means for locking the article accommodating box, the article accommodating box being provided with a bottom portion extending rearwardly above and along the intake system and having a front portion extending upwardly a long a rear upper portion of the cylinder heads.

In a preferred embodiment, the article accommodating box is provided with a cover which has an improved heat insulation structure by constructing the upper portion thereof as a double wall structure for defining an air passage therebetween or by providing a simple member having an air passage for the cover and the article accommodating box.

An air ventilation member is secured to the inner side wall or rear side wall of the article accommodating box so as to take air thereinto for attaining the ventilation effect.

The locking means for locking the cover for the article accommodation box comprises a key switch and a locking member provided for the cover and operatively connected to the key switch by means of a cable, the key switch including a key sensor switch which is turned ON when a key is not inserted into a key hole of the key switch and which is turned OFF when the key is inserted into the key hole, the locking member including a lock sensor switch which is turned ON when a locking condition is established and which is turned OFF when the locking condition is released, the key sensor switch and the lock sensor switch constituting a series circuit together with an alarm such as, for example, a buzzer and a power source.

A motor bicycle is generally provided with a cowling for covering a front portion of the main body of the motor bicycle and, in accordance with a further embodiment, a head lamp is attached to the cowling, the cowling being provided with a window portion covered by means of a cover and an extra helmet accommodating box is secured to a rear portion of the cowling so that an opening of the extra helmet accommodating box faces the window of the cowling.

According to the motor bicycle of the character described above, an article accommodating box particularly for accommodating a helmet is disposed above the engine unit and along the intake system so as to be disposed in an offset manner with respect to the upper portion of the cylinder head of, for example, a vertical type cylinder of the engine unit without affecting the riding position of a rider. Accordingly, the article accommodating box is prevented from being heated by means of the radiant heat from the cylinder head.

The cover for the article accommodating box has a solar heat insulation structure, such as, for example, by constructing the upper portion of the cover to be a double wall structure between which an air passage is formed or by disposing a specific member upon the upper surface of the cover for providing an air passage therefor.

A specific ventilation member is also provided for the article accommodating box for performing air circulation therewithin. The ventilation member and the air passage structure are provided with air ports which are positioned so as not to be adversely affected by means of dust or rain drops.

The article accommodating box is provided with an improved locking mechanism which is associated with a key switch. The unlocked condition of the article accommodating box can be sensed by means of a key sensor switch and a lock member sensor switch and in a case where the box is not locked, an alarm is generated.

A space between the head pipe, the cowling and the front fork is utilized for additionally accommodating an extra helmet accommodating box.

BRIEF DESCRIPTION OF THE DRAWINGS

The preferred embodiments developed according to this invention will be described in greater detail hereunder with reference to the accompanying drawings, in which like reference characters designate like or corresponding parts throughout the several views, and wherein:

FIG. 9 is a sectional view on an enlarged scale of a part of the cover of another embodiment for the article accommodating box;

FIG. 10 is a sectional view taken along the line 10—10 shown in FIG. 9;

FIG. 11 is an illustration showing the contact of a helmet accommodated within the article box and the inner portion of the cover for the article box;

FIG. 12 is a perspective view of a portion of a member constituting one embodiment of the cover for the article accommodating box;

FIG. 31 is a plan view of a key switch of the locking mechanism shown in FIG. 30;

FIGS. 32 and 33 are sectional views taken along the lines 32—32 and 33—33, shown in FIG. 30, representing non-inserting and inserting conditions of the key, respectively;

FIG. 34 is a sectional view taken along the line 34—34 shown in FIG. 30;

DESCRIPTION OF THE PREFERRED EMBODIMENTS

Figure 1:
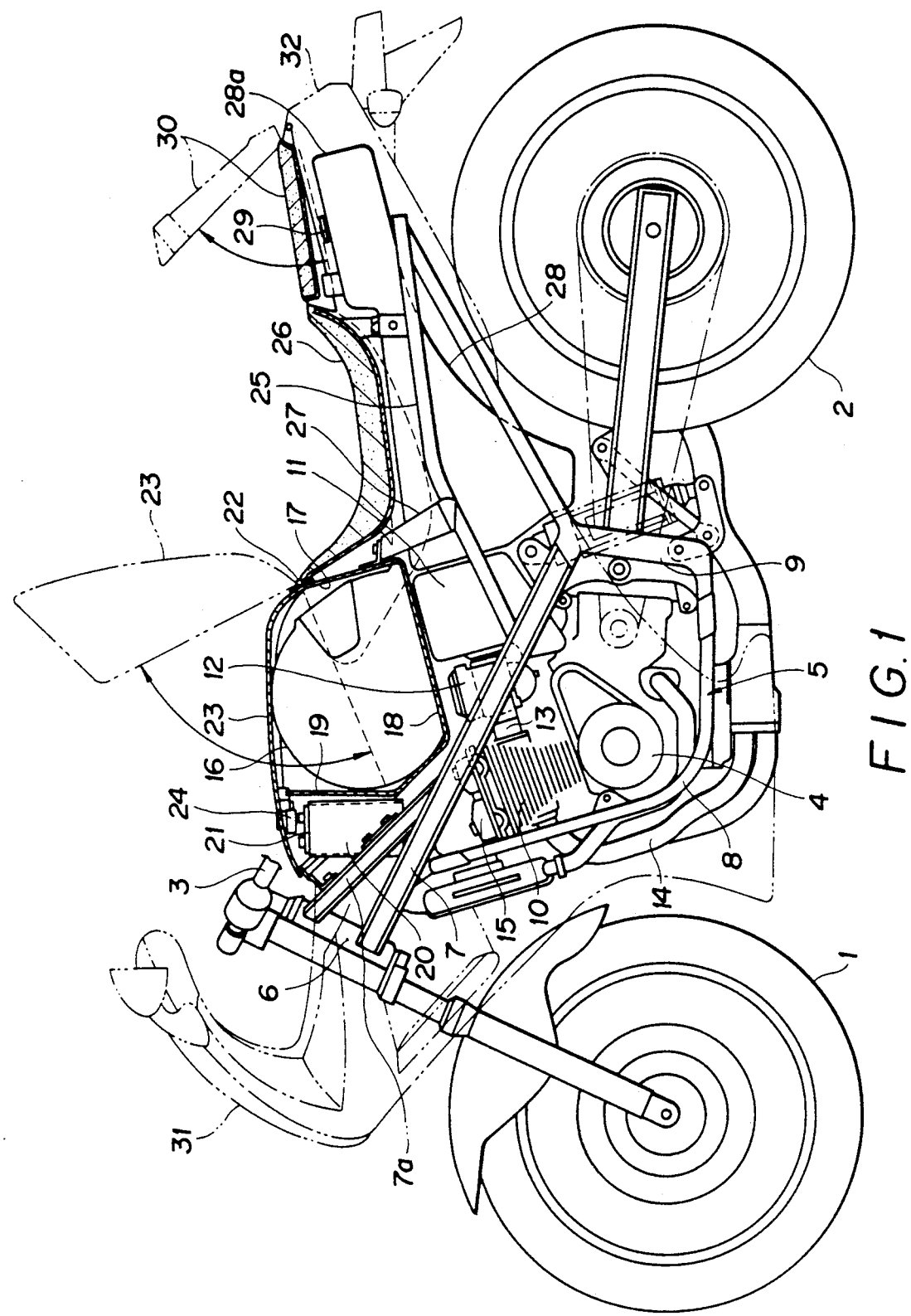
FIG. 1 is a side view, partially broken away, of a motor bicycle provided with an article accommodating box according to this invention.
Figure 2:
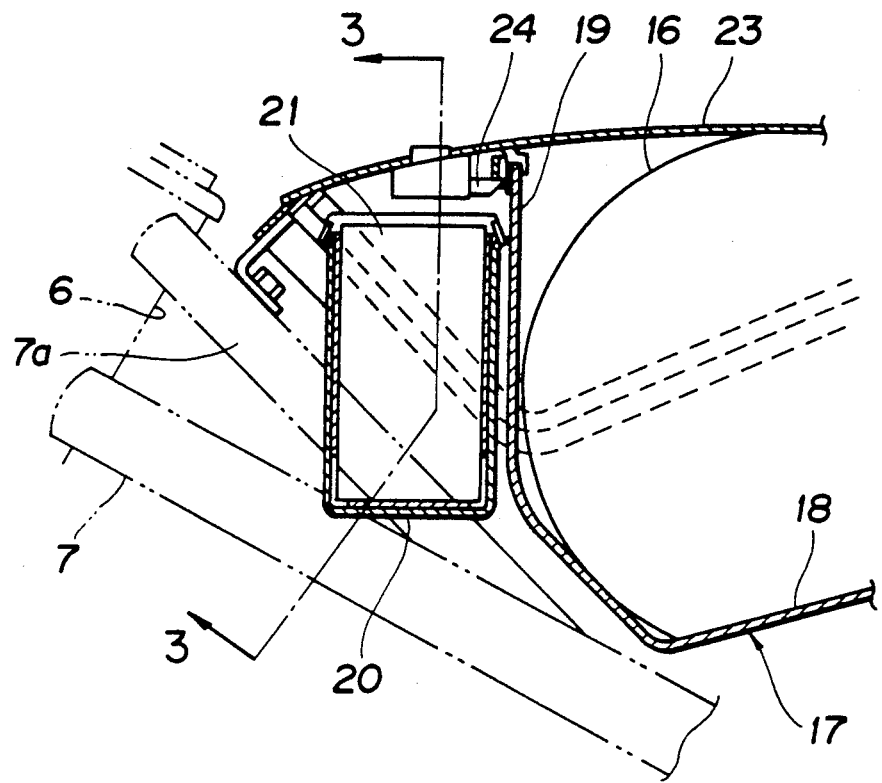
FIG. 2 is a sectional view of a part of the article accommodating box shown in FIG. 1.

Referring to FIG. 1, a motor bicycle generally comprises a front wheel 1 steered by means of handlebars 3, a rear wheel 2 driven by means of an engine and a main body accommodating an engine unit 4 at the central portion thereof. The engine unit 4 is supported by means of a frame 5 comprising in substantially a trapezoidal form a main tube 7 extending rearwardly from a head pipe 6 connecting the handlebars 3 and the front wheel 1, a down tube 8 extending downwardly and then rearwardly from the front end of the main tube 7 and a central tube 9 connecting the rear ends of the main tube 7 and the down tube 8. The engine unit 4 is substantially accommodated within the trapezoidal frame 5.

The engine unit 4 includes a vertical type four-cycle engine in the illustrated embodiment and cylinders 10 of the engine are arranged behind the down tube 8. An intake passage 13 is connected to the rear portion of each cylinder 10 and the intake passage 13 is connected to a carburetor 12, which is connected to an air cleaner. An exhaust passage 14 connected to the front portion of each cylinder 10 extends downwardly and then rearwardly along the down tube 8.

An article box 17 for accommodating an article such as for example a helmet 16 is arranged above the intake passage 13 and the article accommodating box 17 has an inner volume for at least sufficiently accommodating the helmet 16, but not larger than necessary in the longitudinal direction of the body. The bottom portion 18 of the article accommodating box 17 is positioned behind the rear end of a cylinder head 15 and above the intake passage 13 so that the front end of the bottom portion 18 rises upwardly behind the rear end of the cylinder head 15 and is connected to the upper opening portion 19 of the box 17.

Figure 3:
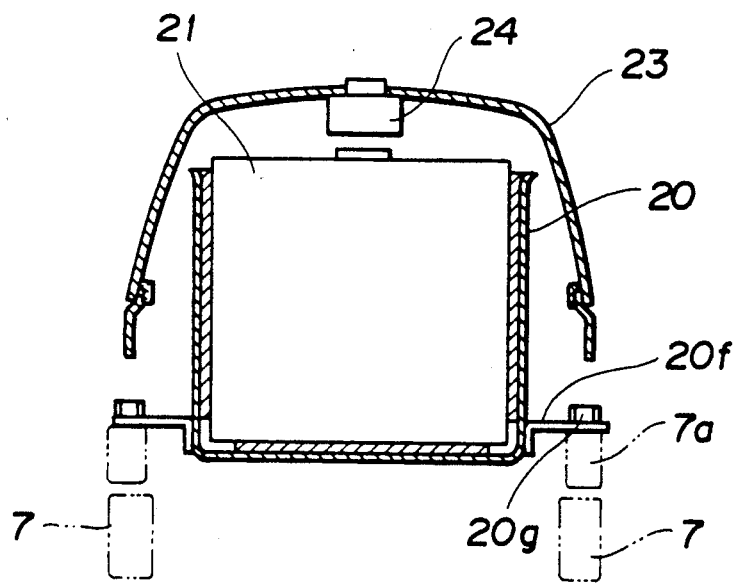
FIG. 3 is a sectional view taken along the line 3—3 shown in FIG. 2.

A battery box 20 acting as a battery holder for accommodating a battery 21 is secured to a bridge tube 7a extending obliquely upwardly from the main tube 7 and forwardly of the front end of the upper portion 18 of the article accommodating box 17 and the lower portion of the battery box is positioned above the cylinder head 15 with a suitable space defined therebetween. The upper opening portion 19 of the article accommodating box 17 and the upper portion of the battery box 20 are covered by means of a cover 23 having a rear end thereof hinged to a rear upstanding wall of box 17 so as be openable about a hinge 22. The box cover 23 is locked means of a locking mechanism 24 when the cover 23 is closed. As shown in FIG. 3, brackets 20f are secured to the bottom portion of the battery box, that is, the battery holder, and the brackets 20f are also secured to the bridge tube 7a by means of bolts 20g.

Figure 4:
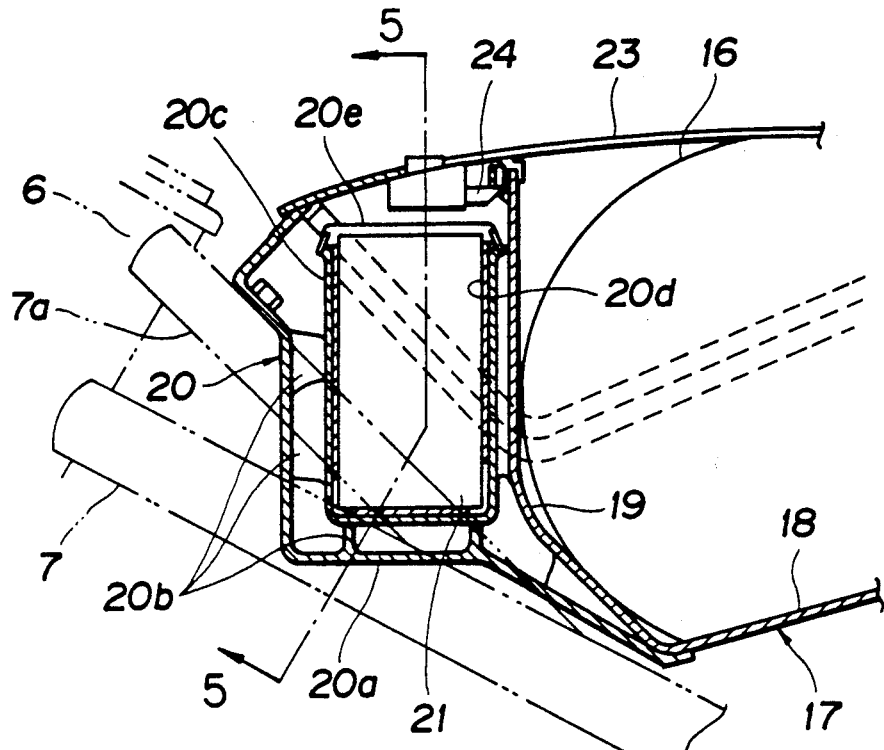
FIG. 4 is a sectional view of a part of a modified article accommodating box similar to that shown in FIG. 1.
Figure 5:
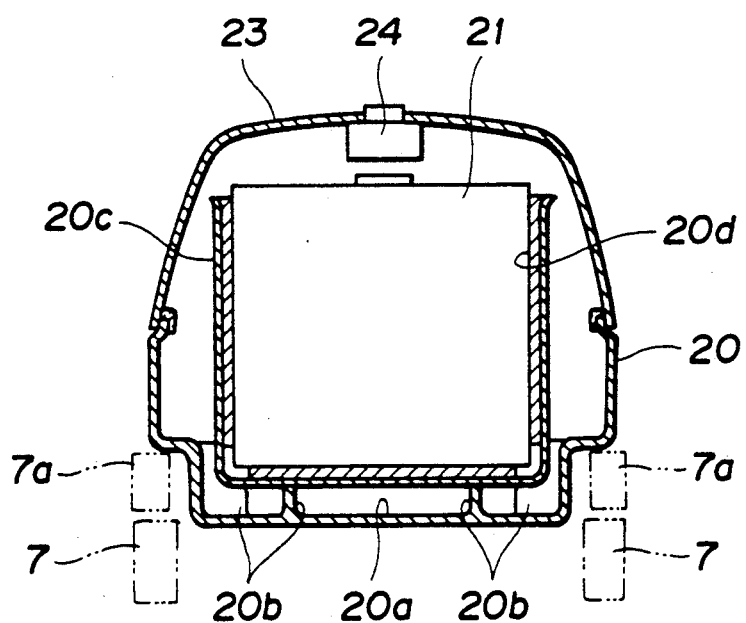
FIG. 5 is a sectional view taken along the line 5—5 shown in FIG. 4.

Referring to FIGS. 4 and 5 showing one preferred arrangement of the battery box 20, a plurality of projecting ribs 20b are disposed upon the inner surface of the battery accommodating box 20 for safely holding a battery holder 20c within which the battery 21 is accommodated. A cushioning member 20d is disposed upon the rear inner surface of the battery box 20 and a band member 20e for clamping the battery box 20 is secured to the upper portion of the battery box 20.

According to this arrangement, the bottom portion 20a of the battery box 20 is connected to the front portion of the bottom portion 18 of the article accommodating box 17 so as to enlarge the space defined between the upper portion 19 of box 17 and the connected bottom portion 20a of box 20, whereby the radiant heat from the cylinder head 15 can be effectively prevented from being transferred to the article accommodating box 17.

Referring to FIG. 1, a bilateral pair of rail members 25 each having one end connected to the rear end portion of the main tube 7 extends rearwardly therefrom upon both sides of the body and a seat 26 disposed directly behind the article accommodating box 17 is mounted upon the rail members 25. The rear portion of the article accommodating box 17 is also mounted upon the rail members 25 by means of brackets 27.

A fuel tank 28 is arranged between the rail members 25 below the seat 26. The fuel tank 28 has a rear portion 28a extending rearwardly of the seat 26 and a fuel pouring port 29 is provided upon the rear portion 28a of the fuel tank 28. A pillion seat 30 is disposed above the rear portion 28a of the fuel tank 28 so as to be pivotably movable with respect thereto in order to provide access to port 29.

The lower side portions of the rear portions of the seat 26 and the pillion seat 30 are covered by means of a body cover 32. Reference numeral 31 designates a cowling disposed in front of the head pipe 6 so as to cover both sides of the engine unit 4.

According to the construction of the motor bicycle described above, the bottom surface 18 of the article accommodating box 17 is positioned below the location of the cylinder head 15, so that the height of the upper portion of the cover 23 from the ground is maintained small and, hence, the riding position of the rider can be suitably maintained.

Moreover, the bottom portion 18 of the article accommodating box 17 is not vertically overlapped so that the bottom portion 18 is not highly heated by means of the radiant heat from the cylinder head 15.

Furthermore, the space defined above the cylinder head 15 can be utilized for accommodating or housing an additional article accommodating box which is commonly covered by means of the cover 23 and into which the battery can be accommodated in a preferred arrangement according to this invention.

In accordance with a further embodiment developed according to this invention, the cover 23 for covering the article accommodating box 17 and/or the battery accommodating box 20 has a structure which is improved so as to effectively attain its heat insulating function. The embodiment will be described hereunder with reference to FIGS. 6 to 12, in which the cover and the hinge are designated by reference numerals 100 and 101, respectively.

Figure 6:
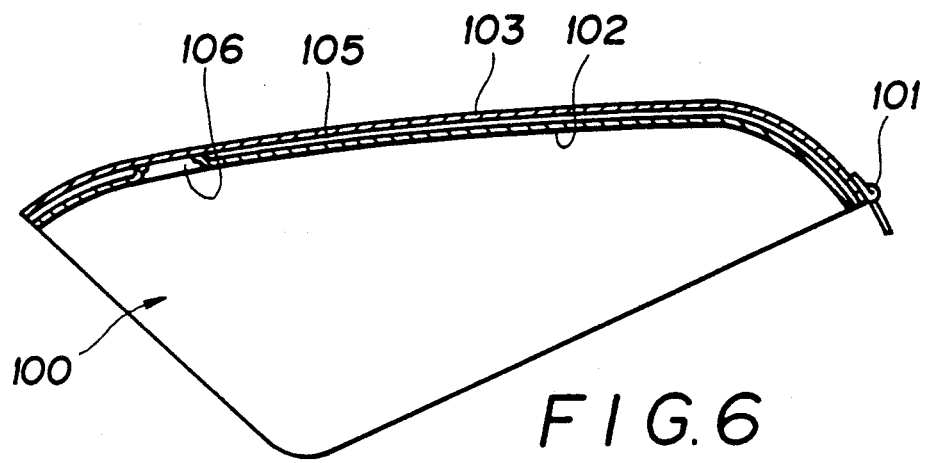
FIG. 6 is a sectional side view on an enlarged scale of a part of a cover for covering the article accommodating box shown in FIG. 1.
Figure 7:
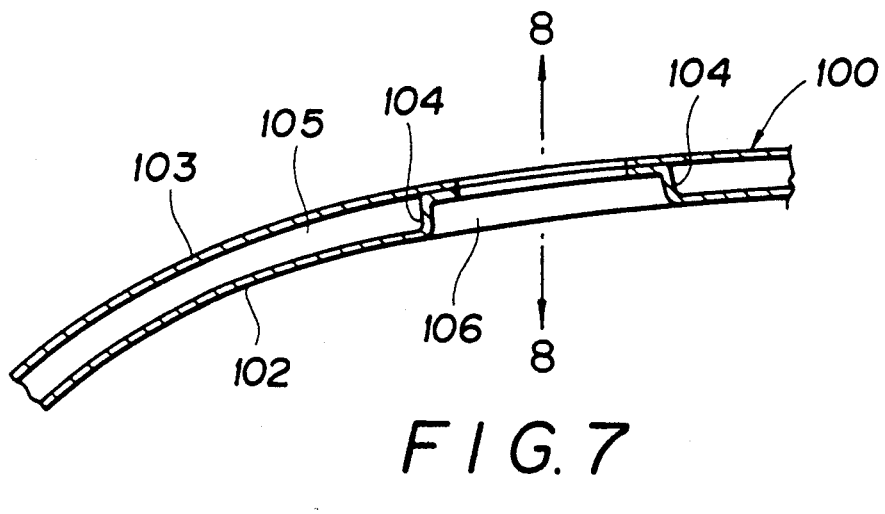
FIG. 7 is a sectional view on a further enlarged scale of a part of the cover shown in FIG. 6.
Figure 8:
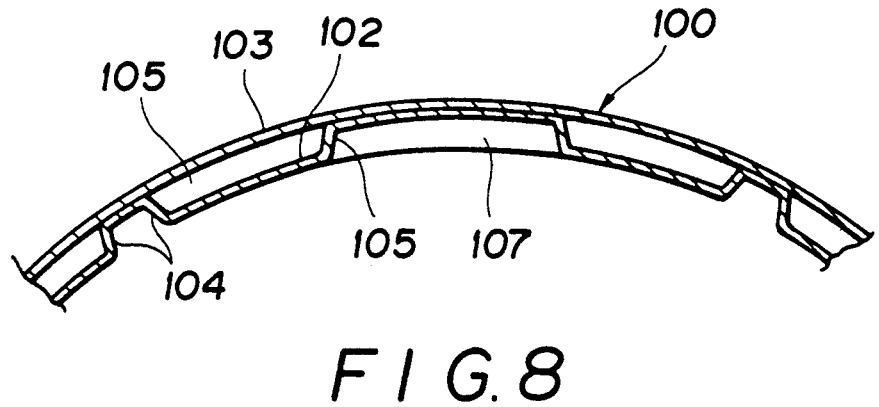
FIG. 8 is a sectional view taken along the line 8—8 shown in FIG. 7.

Referring to FIGS. 6 to 8 showing a part of the box cover 100 corresponding to the cover 23 shown in FIG. 1, the box cover 100 has a double wall structure comprising an inner plate 102 and an outer plate 103. The inner plate 102 is inwardly recessed at certain portions as shown in FIG. 7 or 8 by means of rib-like portions 104 extending in the longitudinal direction of the article accommodating box 17 and an air space or air passage 105 is defined between the inner and outer cover plates 102 and 103 by means of the rib-like portions 104. The front and rear portions of the air space 105 are in communication with the atmosphere.

According to this structure of the cover 100, the heat insulating effect can be attained by means of the existence of the air space defined between the inner and outer cover plates 102 and 103. Namely, the transfer of solar heat to the article such as, for example, the helmet accommodated within the article accommodating box 17 can be reduced and the increase of the temperature within the box 17 can also be restricted. The air space 105 is open to the atmosphere at the front and rear end portions, so that the air within the space 105 can be circulated and the air is always replaced by means of fresh air and, moreover, the air is forcibly conducted throughout the air space 105 during the running of the motor bicycle, thus assuredly attaining the cooling effect.

FIGS. 9 to 12 show a modified embodiment of the cover 100 according to this invention. In this embodiment, the box cover 100 comprises an inner plate 107 formed from an elastic material such as, for example, rubber and an outer plate 103 and an air space is defined between the inner and outer cover plates 107 and 103.

The rib-like portions 108 supporting the inner and outer cover plates are also formed from an elastic material.

According to the modified embodiment, the heat insulating effect can be attained as described with reference to the former embodiment and, in addition, an improved engagement between the elastic inner plate 107 and a portion 109 of the body frame can be achieved. Furthermore, as shown in FIG. 11, a cushioning effect can be attained between the elastic inner plate 107 and the helmet 110 accommodated within the article accommodating box FIG. 12 shows a part of the inner plate 107 according to a further modification, in which a plurality of boss-like projections are formed upon the inner surface of the inner cover plate 107. According to this modification, the air space between the inner and outer cover plates 107 and 103 can be expanded in the longitudinal and widthwise directions of the cover 100, so that the air circulation and cooling effects can be rendered uniform and remarkably improved.

It may be further possible to construct the rear portion of the article accommodating box 17 (FIG. 1) so as to have a double wall structure between which an air space is defined so as to thereby reduce the transfer of the radiant heat from the engine unit to the article such as, for example, the helmet accommodated within the article accommodating box 17.

With the embodiments described above, the double wall structure of the article accommodating box cover is incorporated either entirely or partially throughout the cover structure, and when the double wall structure is only partially incorporated within or upon the cover, it may be specifically provided upon the upper portion of the cover.

In this connection, FIGS. 13 to 23 represent still further embodiments of the article accommodation box cover.

Figure 13:
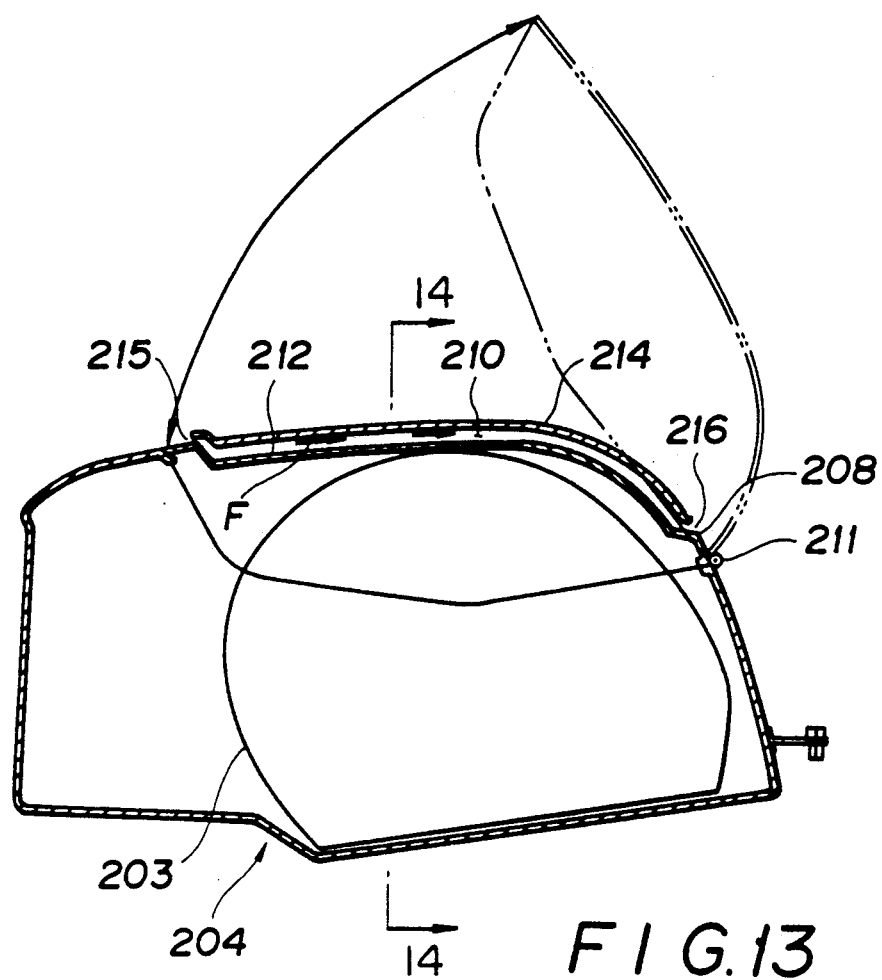
FIG. 13 is a side view of an article, such as, for example, a helmet accommodating box provided with a cover therefor, wherein the cover is provided with an improved heat insulation structure according to this invention.
Figure 14:
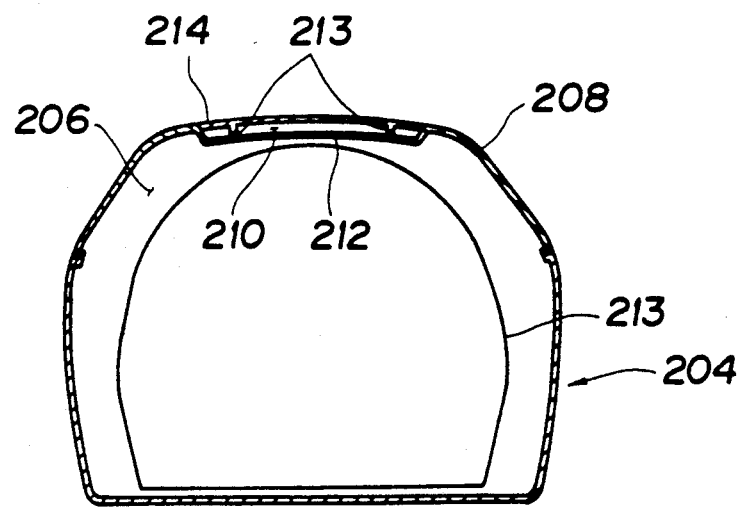
FIG. 14 is a sectional view taken along the line 14—14 shown in FIG. 13.

Referring to FIGS. 13 and 14, the top portion of a cover 208 for covering an article accommodating box 204 is recessed along the axial direction thereof as an inwardly recessed portion 212 and the recessed portion 212 is covered by means of an auxiliary cover plate 214 for defining an air passage 210 between the recessed portion 212 and the cover plate 214. The upper surface of the auxiliary cover plate 214 is made substantially parallel with respect to the upper surface of the article accommodating box cover 208, which is pivotally secured to the article accommodating box 204 by means of a hinge 211 so as to be upwardly openable. A plurality of rib members 213 are secured to the inner surface of the auxiliary cover plate 214 so as to extend in the axial direction thereof and the lower ends of the ribs 213 are engaged with the upper surface of the recessed portion 212 when the auxiliary cover plate 214 is closed. The front and rear end portions of the auxiliary cover plate 214 are bent slightly upwardly as shown in FIG. 13 so as to constitute air intake and exit ports 215 and 216 for facilitating the circulation or passage of the air within the air passage 210 as designated by means of the arrow F. According to this embodiment, the direct heating of the article such as, for example, the helmet accommodated within the box 204 by means of the solar heat can be prevented and, moreover, the box 204 can be heat insulated or cooled by means of the air passing through the air passage 210.

Figure 15:
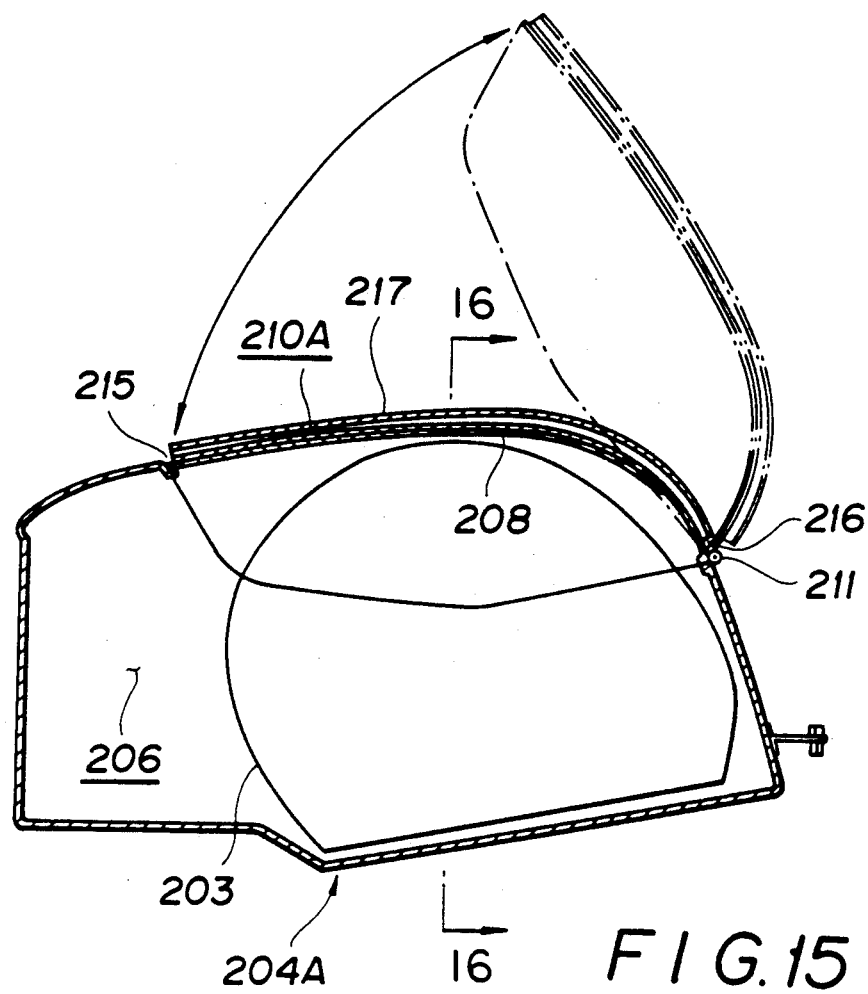
FIG. 15 is a side view of a modified embodiment of that shown in FIG. 13.
Figure 16:
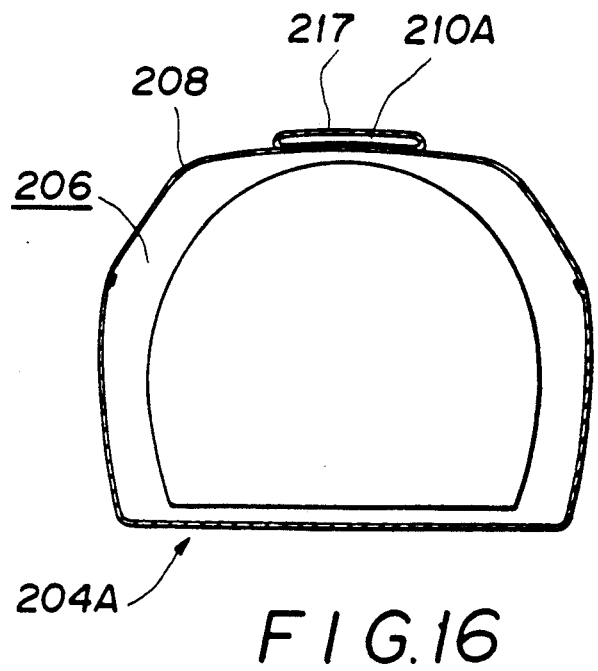
FIG. 16 is a sectional view taken along the line 16—16 shown in FIG. 15.

FIGS. 15 and 16 represent a modification of the embodiment shown in FIGS. 13 or 14, in which a pad 217 made from an elastic material such as, for example, rubber is applied to the upper portion of the cover 208 for the article accommodating box 204A so as to attain the heat insulating function. It is desired that the pad 217 is disposed at a position against which the body of a rider who rides upon the seat of the motor bicycle will be engaged when the rider is disposed in a forwardly inclined attitude. The pad 217 may be constructed so as to have an inner hollow portion, such as, for example, an air passage 210A having openings 215 and 216 as the air intake and exit ports. According to this modification, the upper portion of the article accommodating box 204 and, hence, the interior thereof can be cooled by means of the air passing through the air passage 210A.

Figure 17:
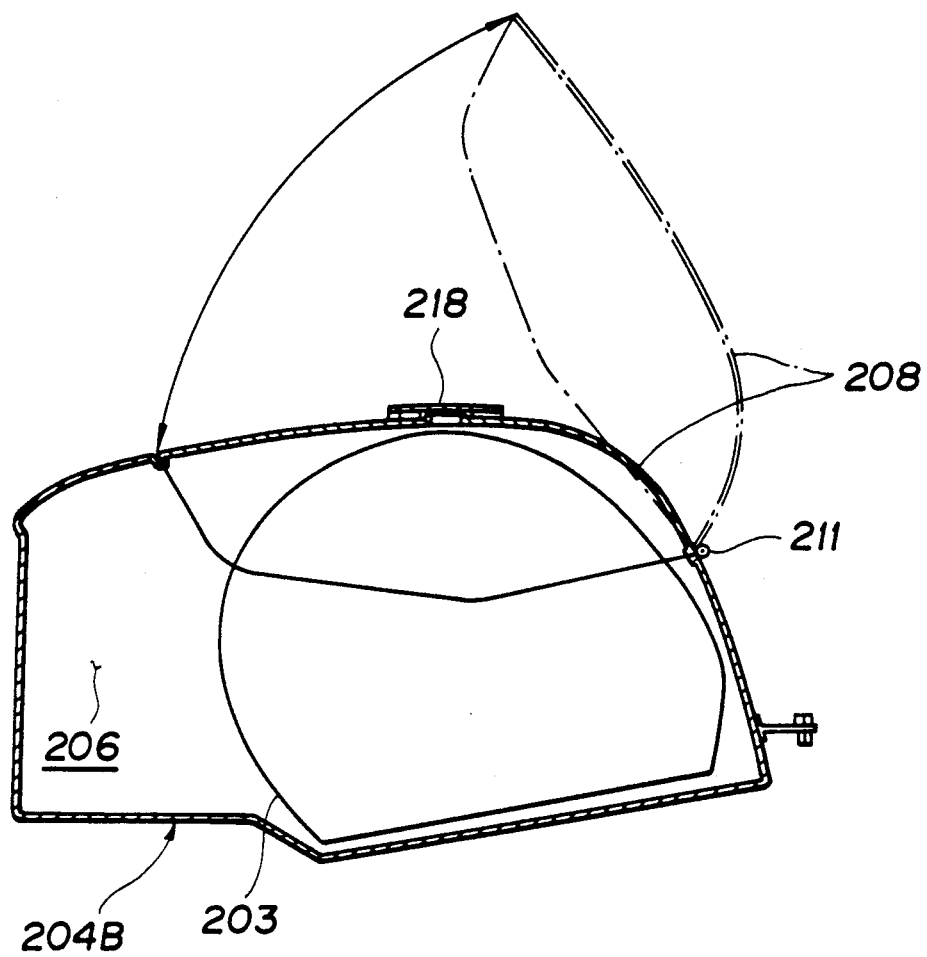
FIG. 17 is a side view of a further modified embodiment of that shown in FIG. 13.
Figure 18:
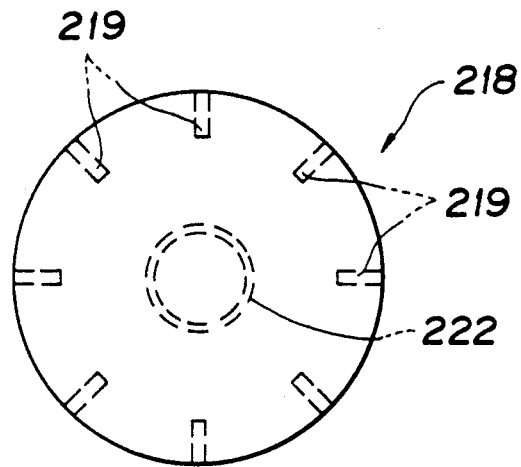
FIG. 18 is a plan view of an auxiliary cover member to be applied to the cover shown in FIG. 17.

FIG. 17 shows a further modification of the heat insulating or cooling structure for the article accommodating box, in which an auxiliary cover member 218 circular in plan view is disposed upon the upper portion of the article accommodating box cover 208. The auxiliary cover member 218 constitutes an air passage member as described hereunder. The upper surface of the air passage cover 218 is plated or coated so as to exhibit a silver or white color appearance so as to substantially reflect the infrared rays. As shown in FIG. 18, the circular air passage cover 218 is secured to the upper surface of the box cover 208 through means of a plurality of radially arranged leg portions 19 so as to provide spaces therebetween for forming air passages 210B. The outer appearance of the circular cover member 218 may be designed so as to exhibit an appearance similar to the design of a cap of a fuel tank so as not to provide a sense of incompatibility.

Figure 19:
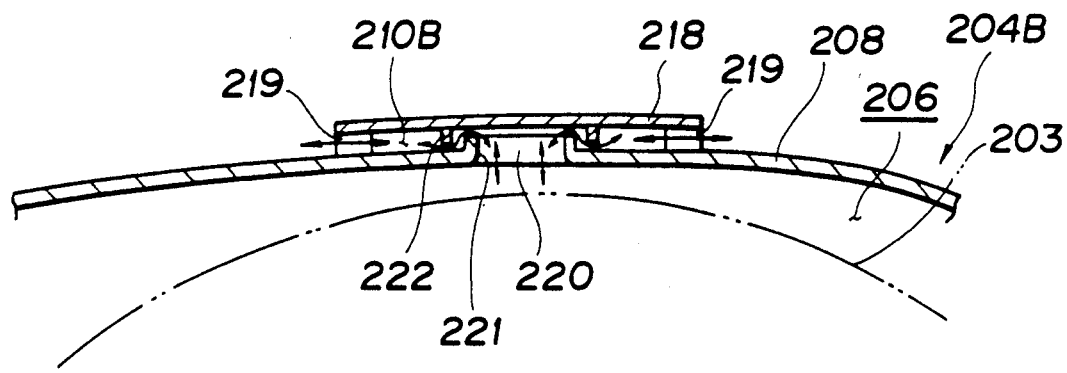
FIG. 19 is a sectional view on an enlarged scale of the auxiliary cover member shown in FIG. 18.

In connection with the embodiment shown in FIG. 17, the cooling effect for the interior of the article accommodating box 204B can be greatly improved by means of the embodiment shown in FIG. 19 on an enlarged scale. Referring to FIG. 19, an opening 220, preferably a circular opening, is formed within the upper portion of the article accommodating cover 208 and the circular cover member 218 is disposed so as to cover this opening 220. According to this structure, the air taken into the cover member 218 through means of the air passages 210B is guided into the interior of the box 204B and circulates therein through means of the opening 220 such that the cooling effect is further improved. In a preferred example of this embodiment, the wall portion 221 of the article accommodating box 204B defining the opening 220 is bent upwardly and a ring shaped leg portion 222 is formed upon the cover member 218 so as to project downwardly in order to enclose the bent wall portion 221, whereby if rain drops are ingested into the air passage cover member 218 during a rainy day, the ingestion of the rain drops into the interior of the article accommodating box 204B will be substantially prevented.

Figure 20:
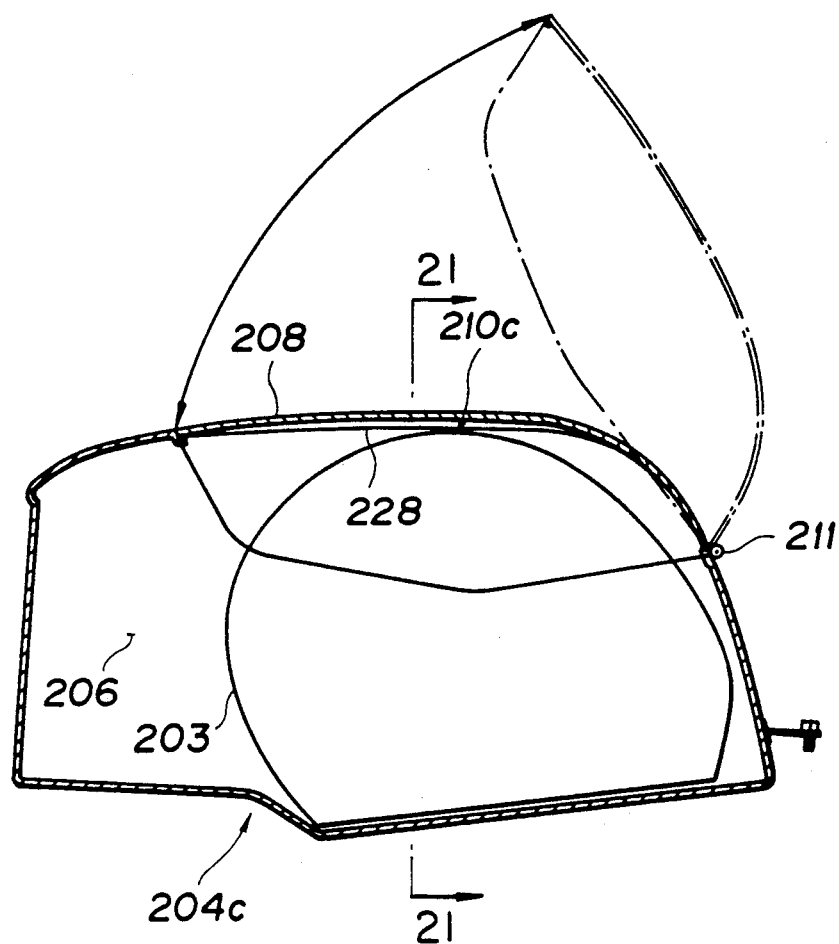
FIG. 20 is a side view of a still further modified embodiment of that shown in FIG. 13.
Figure 21:
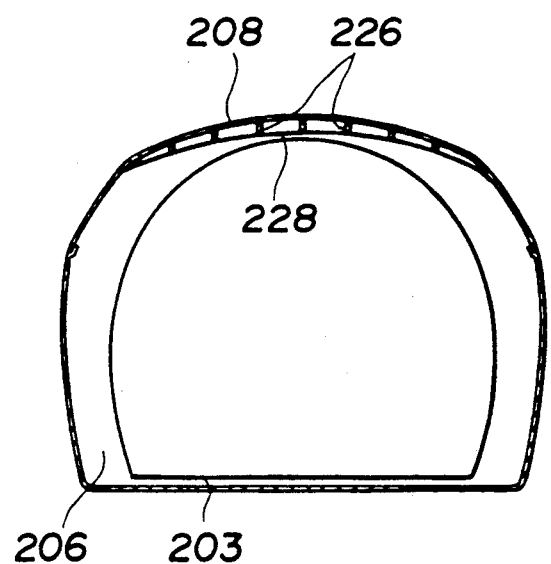
FIG. 21 is a sectional view taken along the line 21—21 shown in FIG. 20.

In further modifications represented by FIGS. 20 and 21, a lining member 228 is applied to the inner surface of the cover 208 of the article accommodating box 204C in such a manner that an air space is defined between the lining member 228 and the inner surface of the cover 208. The lining member 228 is disposed so as not to contact the inner surface of the box cover 208 by arranging continuous or incontinuous, in the axial direction thereof, projecting members 226 between the lining member 228 and the inner surface of the box cover 208 so as to thereby form the air passage therebetween.

Figure 22:
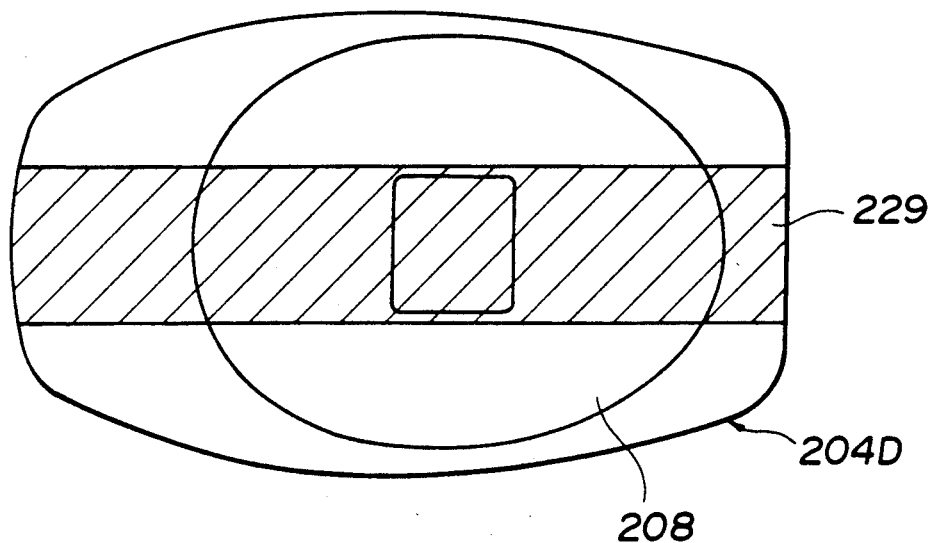
FIG. 22 is a top plan view of a cover for an article accommodating box provided with a heat insulation coat.

With the article accommodating box cover 208 shown in FIG. 22, a reflecting portion 229 is formed upon the upper portion of the cover 208 by coating a white or silver color strip thereon or bonding a tape of white or silver color or a seal upon which an operational explanation or the like is printed so as to prevent the direct transfer of the infrared rays of the solar heat to the article 203 such as, for example, the helmet accommodated within the box 204D.

It will be easily understood that the cover for the article accommodating box according to this invention is not limited to the application to the box of the character specifically represented by FIGS. 1 to 5.

Figure 23:
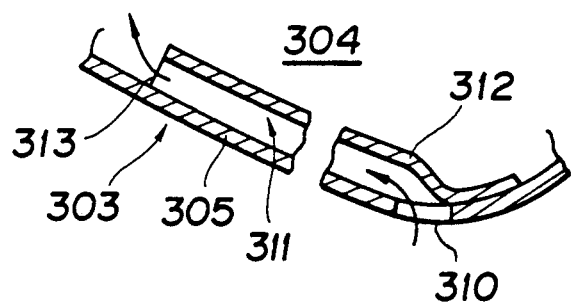
FIG. 23 is a sectional view of an air passage member to be attached to an inner wall of an article accommodating box, such as for example the box shown in FIG. 1.
Figure 24:
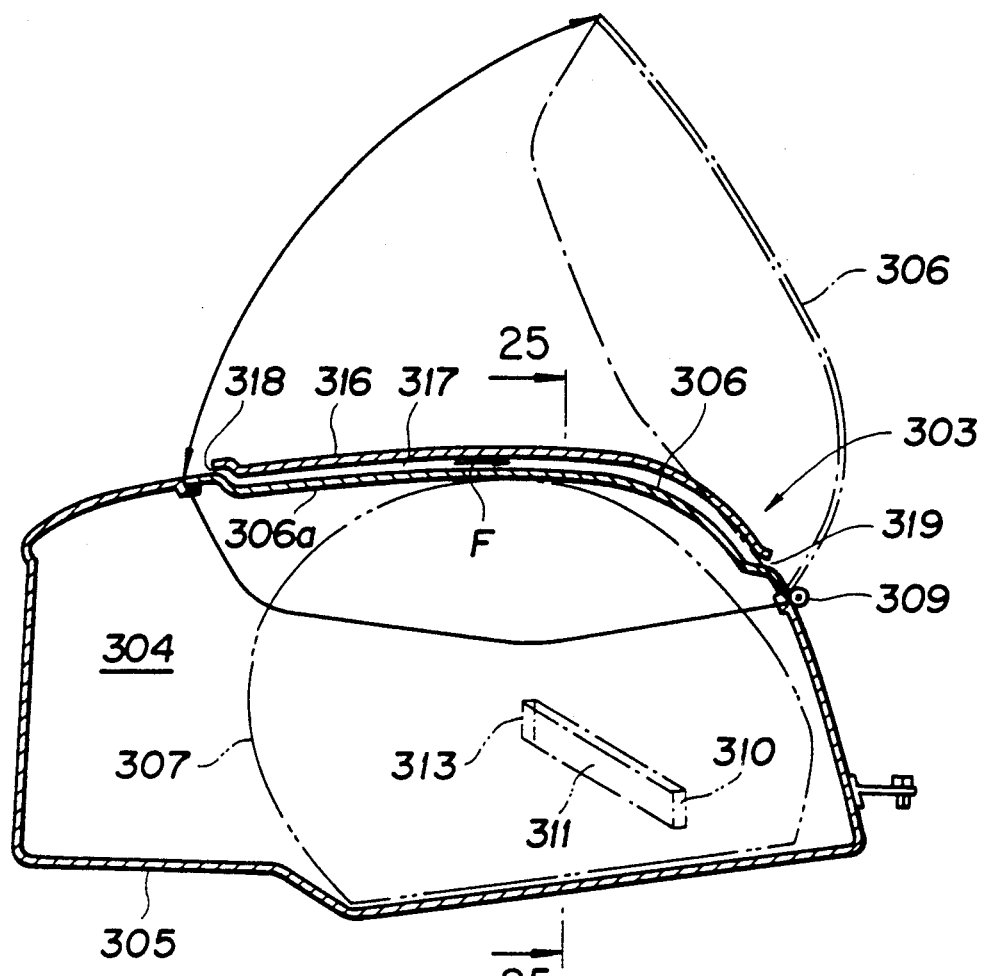
FIG. 24 is a side view of the article accommodating box provided with the air passage member shown in FIG. 23.
Figure 25:
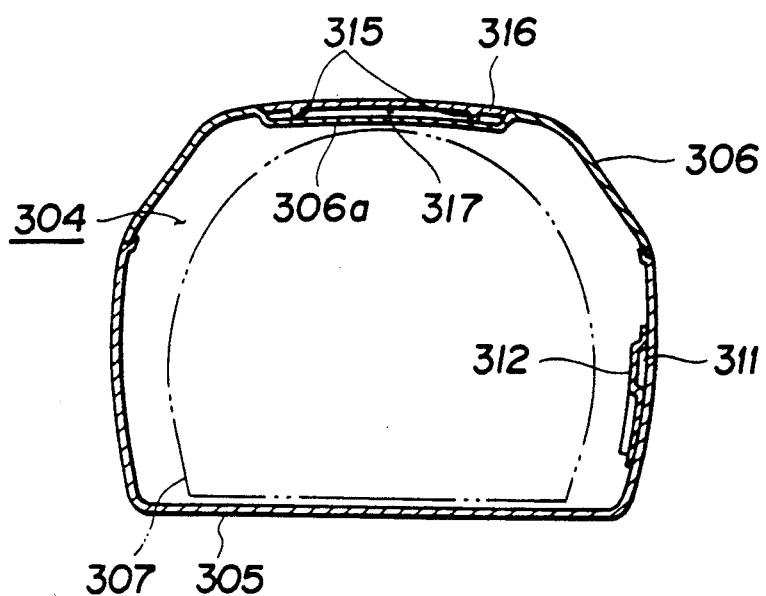
FIG. 25 is a sectional view taken along the line 25—25 shown in FIG. 24.

FIGS. 23 to 25 represent a still further embodiment according to this invention. According to the illustrated embodiment, a plate like passage member 312 is attached to the inner side wall of an article accommodating box 305, within which a ventilation opening 310 is formed. The passage member 312, in the attached condition, is disposed so as to cover the ventilation opening 310, which is directed laterally or rearwardly, as shown in FIGS. 23 and 24, with respect to the advancing direction of the motor bicycle. The ventilation opening 310 communicates with the interior 304 of the article accommodating box 305 through means of a ventilating passage 311 having an opening 313 formed in the end opposite the opening 310. The passage member 312 may be disposed upon both inner side walls of the box 305.

As shown in FIG. 23, the pasage member 312 is attached in an inclined, bent or stepped manner so that the opening 310 is disposed at a level lower than the opening 313.

According to this structure, when the motor bicycle is driven ventilating air is guided into the interior of the article accommodaing box 305 through means of the opening 310, the ventilating passage and the opening 313. At this time, since the opening 310 is directed laterally or rearwardly with respect to the advancing direction of the motor bicycle, rain drops are not ingested into the interior of the box 305 and this function is thus facilitated by means of the positional relationship defined between the openings 310 and 313.

FIG. 24 shows a condition in which the ventilating passage member is attached to the article accommodating box of the type shown in FIG. 14 as one example.

It will also be noted that the ventilating passage member 312 of the character described above can be provided for the article accommodating box of the type not specifically limited to that shown in FIGS. 1 to 5 and that the ventilating passage member 312 can be commonly applied to the article accommodating box covers of the types described with reference to FIGS. 6 to 22.

Generally, a helmet for a rider for a motor bicycle has the outer configuration similar to an outer shape of an egg and an article accommodating box for, particularly, acommodating a helmet has an inner shape suitable for accommodating the helmet with the upper surface thereof positioned upwardly and with the front side, that is, the side facing the face of the rider, positioned rearwardly, as shown in FIG. 1.

Figure 26:
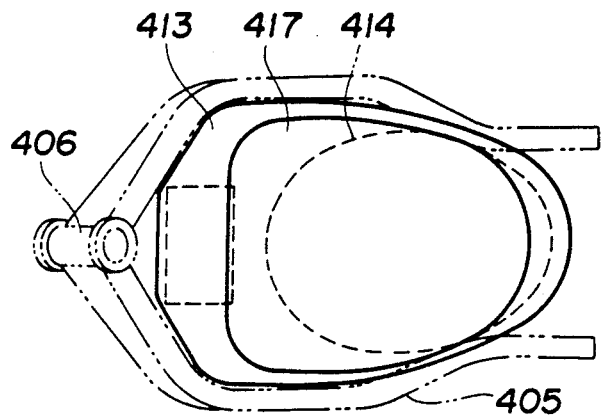
FIG. 26 is a plan view of an article, that is, a helmet accommodating box according to another embodiment of this invention.

In this regard, a typical helmet has an egg or ovoid shape with a slightly swelled rear portion and a slightly narrowed front portion as viewed from the upper side thereof and, as viewed from the side portion, the rear head portion of the helmet is slightly swelled upwardly and rearwardly and the front portion slopes forwardly downwardly. As shown in FIG. 26, a helmet accommodating box 413 and a rear half portion of a cover 417 for accommodating a helmet 414 have shapes corresponding to the outer configuration of the front side, that is, the rider face side, shape of the helmet 414. Namely, the upper portion and both side portions of the helmet accommodating box 413 which are continuous from the front portion of a seat 411 (FIG. 27) for the rider disposed toward the rear portion of the accommodating box 413 are defined by means of gentle curves.

Figure 27:
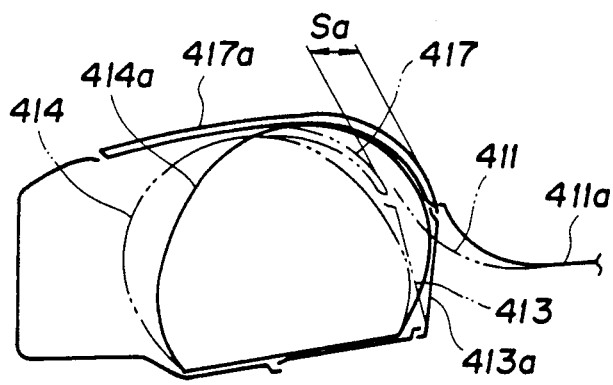
FIGS. 27 and 28 are side views of helmet accommodating boxes within which helmets are accommodated in different states.
Figure 28:
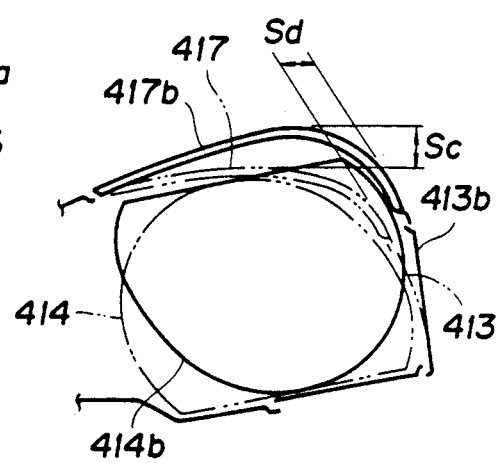
Figure 29:
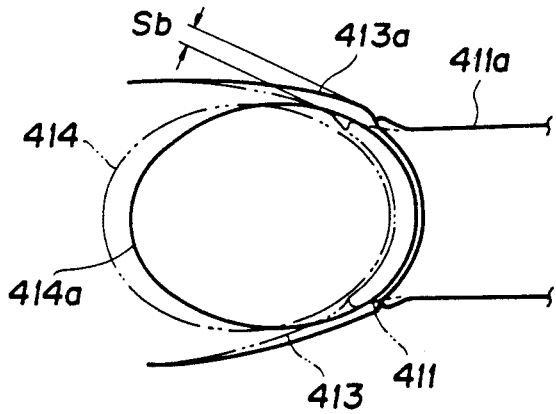
FIG. 29 is a plan view of the helmet box shown in FIG. 27.

FIGS. 27 and 28 are side views showing helmet accommodating conditions. FIG. 27 shows a condition in which a helmet 414a is accommodated within a helmet accommodating box 413a with the front portion of the helmet positioned forwardly and the rear portion of the helmet facing the rider sitting upon a seat 411a, while FIG. 28 shows a condition in which the helmet 414b is accommodated within the box 413a in a state inverse to that shown in FIG. 27. Referring to these figures, the locations of the helmet accommodating box 413, the box cover 417 and the seat 411 according to the embodiment of this invention are shown with double dotted lines for the sake of comparison. FIG. 29 is a plan view of the state shown in FIG. 27.

Referring to FIGS. 27 to 29, the solid lines representing the location of the seat 411a and the article accommodating box 413a show states in which the helmet 414a is accommodated with the front face side thereof disposed forwardly.

With reference to FIG. 27, the article accommodating box cover 417a is largely expanded outwardly and upwardly as represented by means of the dimensional symbol Sa and, hence, the axial length of the seat 411a is made short. With reference to FIG. 29, the box cover 417a is also expanded bilaterally as shown by means of the dimensional symbol Sb. With reference to FIG. 28 in which the helmet 414 is inversely disposed within the box 413, the box cover 417b is expanded upwardly at the rear portion thereof as shown by means of the dimensional symbol Sc whereby the upper portion of the cover 417b is sharply sloped downwardly and forwardly and the front portion of the seat will be shorten by means of the length Sd.

As described above, the positional relationship between the article accommodating box cover 417 and the seat 411 can be improved by constructing the article accommodating box 413 so as to have a shape in which the helmet 414 is accommodated with the front portion thereof opposed toward the seat side. According to this structure, the relationship between the box cover 417 and the rider upon the seat 411 can also be improved and the riding position of the rider can be suitably determined. Namely, the dimensions Sa, Sb, Sc and Sd can be reduced according to this invenion in which the article accommodating box is designed so that the helmet is accommodated therein with the front face side of the helmet disposed rearwardly toward the seat side.

With the embodiment shown in FIG. 26, it may be desired to design the cover for the article accommodating box such that the same is openable forwardly.

In the meantime, it is necessary to lock the cover of the article accommodating box for a motor bicycle of the type described hereinbefore, and a locking mechanism or device is generally mounted upon a portion of the box as designated by reference numeral 24 in FIG. 1, such as, for example, at the front portion of the article accommodating box. The locking mechanism is released by means of a key. For this purpose, in a conventional structure, a specific key is utilized to be inserted into and engaged with a key hole formed within the upper portion of the box cover, or a key switch for controlling an ignition switch is commonly used for the locking of the box cover. In the former arrangement, since the key hole is accessible within the upper surface of the box cover, rain drops or dust are likely to collect within the key hole, which may result in an erroneous operation of the locking of the cover box. In the latter case, the locking of the cover box is remotely unlocked by turning an engine key inserted into the key switch whereby a cable means connecting an operation lever secured to a rotation shaft of the key switch and a hook of the locking mechanism, operates the locking mechanism. With the latter case, there is no key hole upon the upper portion of the box cover, so that the intrusion of the rain drops or dust particles can be prevented and a fine appearance can be provided. However, in the latter case, a rider may forget to lock of the cover for the article accommodating box or may erroneously lock the same, and in an adverse case such as, for example, if the locking mechanism was left unlocked, an article such for example, the helmet accommodated within the box may be stolen. In addition, the locking condition may be inadvertently released or not in fact properly achieved as a result of an insufficient connection of the cable means.

This invention, from this point of view, provides an improved locking device for an article accommodating box for a motor bicycle which is capable of safely and securely locking the article accommodating box cover, and which will now be described in detail hereunder with reference to FIGS. 30 to 34.

Figure 30:
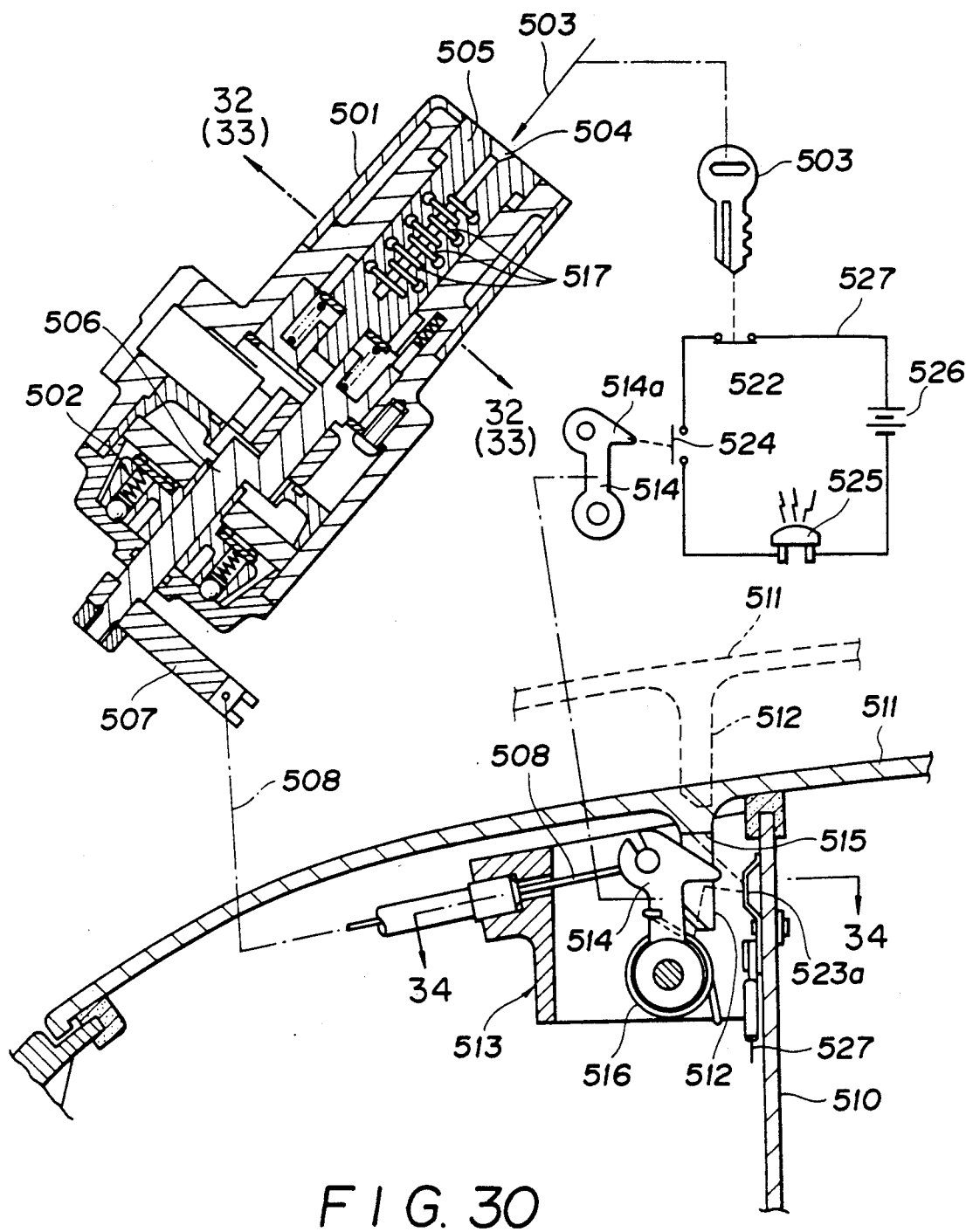
FIG. 30 shows a schematic, exploded arrangement of a locking mechanism for the article accommodating box shown, for example, in FIG. 1.

FIG. 30 is a view representing an arrangement of a switch for controlling an alarm circuit. A key switch 501 is provided with an engine ignition switch 502 and is arranged upon a panel disposed at a location near a head pipe of a motor bicycle. The key switch 501 is also provided with a key cylinder 505 having a key hole 504 into which an engine key 503 is to be inserted. The ignition switch 502 can be operated between its ON or OFF states as a result of being controlled through means of a rotation pivot 506 by inserting the key 503 into the key hole 504 and rotating the same. The control operation will be achieved, in one example, by rotating the key in the clockwise direction as shown by means of the solid arrow in FIG. 31, such as, for example, from a neutral position. The rotation pivot 506 has a front end to which is secured an operation lever 507 to which is connected one end of a cable 508. When the rotation pivot 506 is rotated in the counterclockwise direction, the cable 508 is pulled, the rotation of the pivot 506 being operated by rotating the key in the counterclockwise direction as shown by means of dotted arrow in FIG. 31 in a manner reverse to that for the control of the ignition switch 502. A clearance 509 exists between the connection of the operation lever 507 and the cable 508 so that, when the ignition switch 502 is turned ON, the cable 508 is not pulled.

An engaging piece 512 is provided upon the lower surface of a box cover 511 for an article accommodating box 510 so as to extend downwardly. The box 510 and the box cover 511 are arranged at substantially the same positions as those shown in FIG. 1, so that only parts of the locking device are illustrated in FIG. 30. The locking device for the article accommodating box 510 is provided with a locking mechanism 513 having a hook member 514. The hook member 514 has a front projection 514a which is engaged with an engaging hole 515 formed within the engaging piece 512 so as to lock the box cover 511. A spring means 516 is resiliently mounted upon the hook member 514 so that the projection 514a of he hook member 514 can automatically project into the engaging hole 515 of the engaging piece 512 when the box cover 511 and, hence, the engaging piece 512, is lowered so as to lock the box cover 511.

The other end of the cable 508 is guided into the locking mechanism 513 and is connected to the hook member 514 as best shown in FIG. 34. When the engine key 503 inserted into the key hole 504 is rotated in the counterclockwise direction, the operation lever 507 pulls the hook member 514 through means of the cable 508 so as to thereby release the locking of the box cover 511.

The cylinder 505 of the key switch 501 is equipped with a plurality of rotation stop plates 517. As shown in FIG. 32, the rotation stop plates 517 are supported so as to be slidable in a lateral direction so as to project into grooves 519 formed within the body of the key switch 501 by means of return springs 518 so as to thereby stop the rotation of the cylinder 505. When the engine key 503 is inserted into an individual key hole 520 of each plate 517, the rotation stop plates 517 are removed from the grooves 519 so as to thereby enable the cylinder 515 to be rotated as shown in FIG. 33. Contacts 521a and 521b are disposed at the bottom portion of each of the grooves 519 so as to oppose the front end 517a of each rotation stop plate 517. The contacts 521a and 521b and the front end 517a of the stop plate 517 constitute a key sensor switch 522 (FIG. 30) so as to be operated in such a manner that when the engine key 503 is not inserted into the key hole 504 of the key switch 501, the front end 517a of each rotation stop plate 517 contacts the contacts 521a and 521b so as to thereby switch ON the key sensor switch 522 (FIG. 32) and when the key 503 is inserted into hole 504, the contact between each rotation stop plate 517 and the contacts 521a and 521b is released so as to thereby switch OFF the key sensor switch 522 (FIG. 33).

Referring to FIG. 34 showing the locking mechanism for the article accommodating box 510, a pair of contacts 523a and 523b are secured to the wall surface of the box 510 at locations opposing the front projection 514a of the hook mamber 514 so as to constitute a lock sensor switch 524 (FIG. 30). When the box cover 511 is closed and the projection 514a of the hook member 514 is engaged with the engaging hole 515 of the engaging piece 512, the front end 514a of the hook member 514 is separated from the contacts 523a and 523b so as to thereby switch OFF the lock sensor switch 524. On the other hand, when the locking condition of the box cover 511 is released and the engaging piece 512 is moved upwardly, the hook member 514 is swung by means of biasing force of the spring means 516 so that the front projection 514a of the hook member 514 contacts the contacts 523a and 523b so as to thereby switch ON the lock sensor switch 524.

As briefly shown in FIG. 30, the key sensor switch 522 and the lock sensor switch 524 constitute an alarm circuit 527 together with a buzzer 525 and an electric power source 526 connected in series to the switches 522 and 524. Accordingly, when both the sensor switches 522 and 524 are switched to the ON state, the alarm circuit 527 is closed so as to thereby operate the buzzer 525 and generate an alarm. More concretely, the alarm is generated by means of the buzzer 525 only at a time when the engine key 503 is not inserted into the key switch 501 and the locking mechanism 513 of the accommodating box 510 is released, and the alarm is not generated at a time when the engine key 503 is inserted into the key switch 501 or the locking mechanism 513 is in the locking state.

As described hereinabove, the buzzer 525 is not operated when the engine key 503 is removed, that is, when the key sensor switch is ON, as long as the locking mechanism 513 is in operation, that is the lock sensor switch is OFF, as a result of the box 510 being locked. In case the cable 508 is cut, the locking mechanism 513 is unlocked, the lock sensor switch 524 will be ON and the buzzer 525 will be operated so as to generate an alarm. On the other hand, when the engine key 503 is removed in such a state, that the locking mechanism 513 is in the unlocked state, that is the lock sensor switch is ON, the key sensor switch is ON and the buzzer 525 is operated so as to generate an alarm and thereby inform one of the unlocked condition of the locking mechanism 513.

The operation of the ignition switch and the releasing operation of the locking mechanism 513 of the article accommodation box 510 are performed by rotating the key in opposite directions so that the box cover 511 is effectively prevented from being erroneously opened during the running of the motor bicycle.

The motor bicycle may be provided with body covers 32 as described hereinbefore and shown in FIG. 1 upon both sides of the body of the motor bicycle below the seat 26 and the pillion seat 30 and with the cowling 31 covering both sides of the engine unit 4 from the front portion of the head pipe 6.

Usually, with the arrangement of the respective structional elements or members of a motor bicycle, a dead space having a relatively large volume is provided between the rear portion of the cowling, the head pipe and the upper end portion of the front fork.

Figure 35:
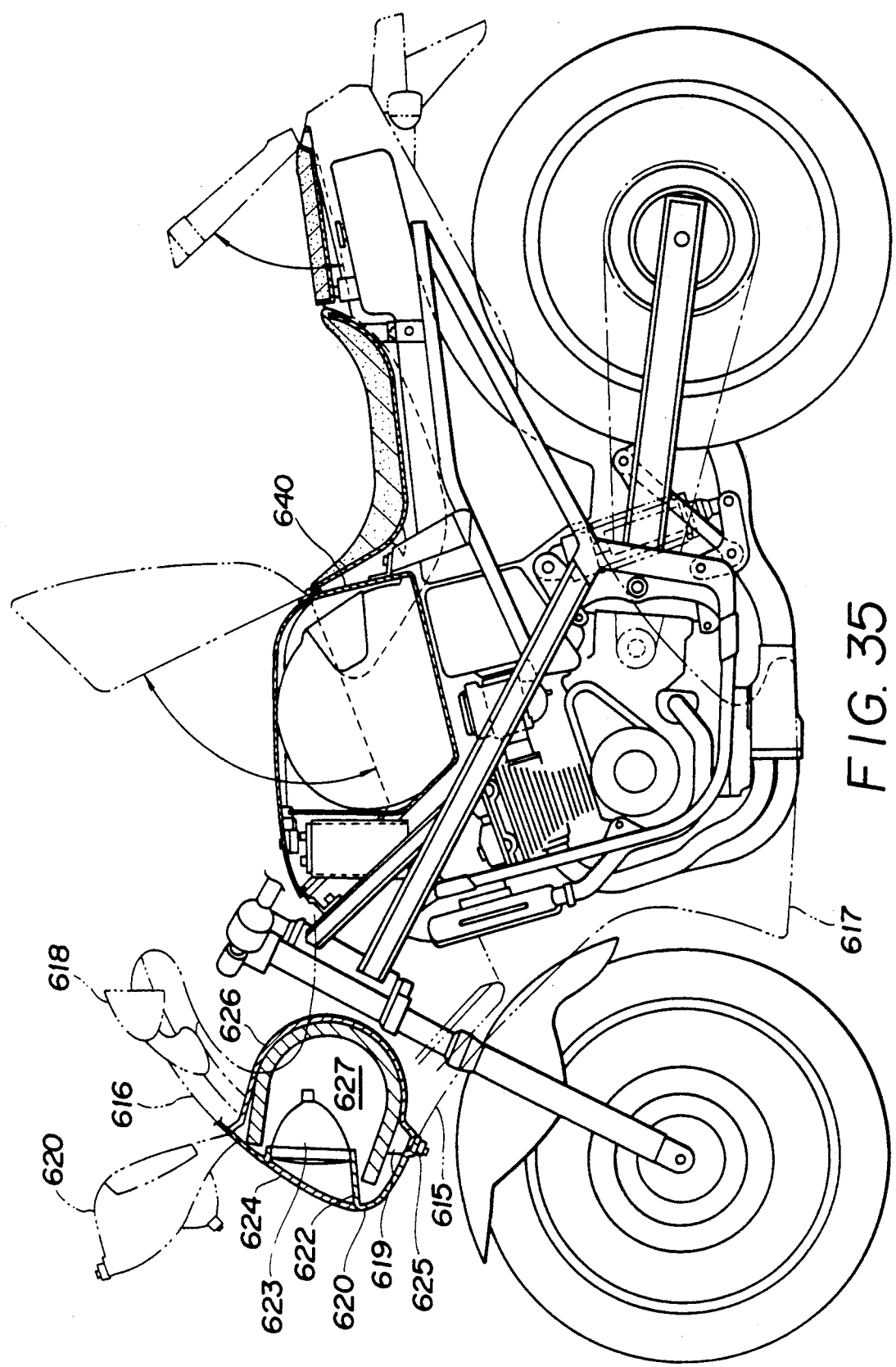
FIG. 35 is a side view of a motor bicycle similar to that shown in FIG. 1 but provided with an extra helmet accommodating box.

Consequently, referring to FIG. 35, the upper portion of the cowling 615 is connected to a wind protecting screen 616 and the lower portion thereof is connected to a fairing 617. Reference numeral 618 designates a rearview mirror. The front portion of the cowling 615 is provided with a window 619 and a cover 620 for the window 619 is opened upwardly as shown by means of the dotted lines about a hinge means 621 shown in FIG. 36. A head lamp housing 622 is mounted upon the rear surface of the cover 620 and a head lamp 623 is accommodated within the housing 622. A screen 624 is attached to the front surface of the cover 620. The head lamp 623 is moved upwardly together with the cover 620 when the cover 620 is opened upwardly. The cover 620 is locked by a suitable locking means 625 to the cowling 615 when the cover 620 is closed.

An additional article accommodating box 626 is mounted upon the rear portion of the cowling 615 with the opening of the box 626 corresponding to the window 619. The article accommodating box 626 has an inner shape suitable for accommodating a helmet 627 with the opening of the helmet directed forwardly so that the head lamp 623 can be positioned inside the helmet 627 when the cover 620 is closed after the helmet 627 is accommodated within the box 626.

Figure 36:
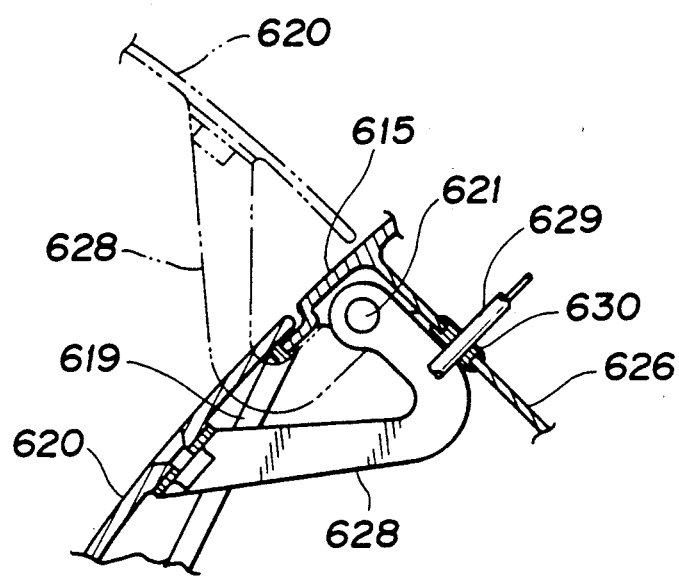
FIG. 36 is an enlarged sectional view of a hinge member for a cover for the helmet accommodating box shown in FIG. 35.

Referring to FIG. 36, the hinge means 621 for the cover 620 is journaled upon the inner surface of the upper portion of the cowling 615 above the upper edge of the window 619 and the upper edge of the cover 620 is supported through means of an L-shaped lever 628. A lead wire 629 for the head lamp 623 is introduced thereto through means of a grommet 630 provided within the helmet accommodating box 626.

Figure 37:
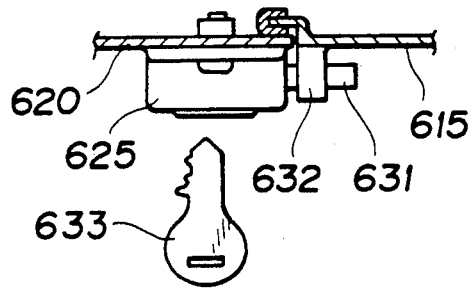
FIG. 37 is an enlarged sectional view of a lock member for the cover shown in FIG. 30.
Figure 38:
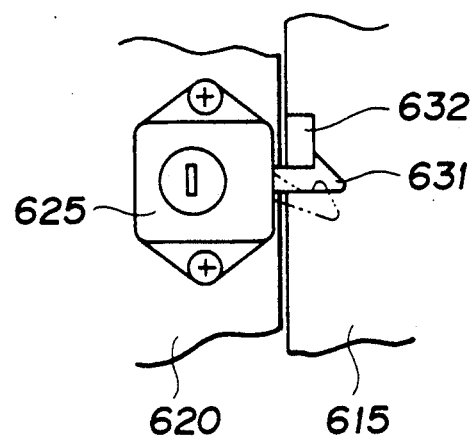
FIG. 38 is a bottom plan view of the lock member of FIG. 37.

The locking means 625 is shown in FIG. 37 or 38 and referring to FIG. 37 or 38, the locking means 625 is mounted upon the lower end portion of the cover 620 and is provided with a hook member 631 to be engaged with a stopper member 632 secured to the cowling 615. The hook member 631 is automatically engaged with the stopper member 632, when closed, by means of a spring operatively connected to the hook member 631. The locking of the cover 620 can be released by means of the operation of a key 633.

As described above, according to this invention, an additional helmet accommodating box is secured to the front portion of the motor bicycle, that is, within the space defined between the rear surface of the cowling, the head pipe and the front fork without making any design change of an existing motor bicycle. Accordingly, an additional helmet can be accommodated together with a helmet accommodated within a helmet accommodating box 640.

Referring to FIG. 35, the remaining structure of the motor bicycle is substantially the same as that shown in FIG. 1, so that the details thereof are omitted herefrom.

The helmet accommodating box 626 may be formed integrally or independently of the cowling.

In a modification in which a motor bicycle is equipped with a bilateral pair of head lamps, the additional article accommodating box may be arranged between these head lamps.

Obviously, many modifications and variations of the present invention are possible in light of the above teachings. It is therefore to be understood that within the scope of the appended claims, the present invention may be practiced otherwise than as specifically described herein.

What is claimed is:

1. A motor bicycle, comprising:
    a front wheel steered by means of a handle and through means of a head pipe;
    a main body equipped with an engine unit located at a substantially central portion of said main body and including multiple cylinders having cylinder heads and with an intake system extending rearwardly from said cylinders of said engine unit;
    a seat for a rider located at a rearwardly upper portion of said main body;
    a rear wheel disposed below said seat and driven by said engine unit; and
    an article accommodating box provided with a cover to be opened and a locking means for locking said article accommodating box when said cover is disposed in a closed position, said article accommodating box being provided with a bottom portion extending rearwardly above and along said intake system and having a front portion extending upwardly at a rear upper portion of said cylinder heads, said cover being of a double wall structure having outer and inner plates between which is defined an air space which is divided by projection means into a plurality of sections extending in a direction along a travelling direction of said motor bicycle, and having means for providing air flow through said air space as said motor bicycle travels along said travelling direction.

2. A motor bicycle according to claim 1, wherein said engine unit is a vertical cylinder type.

3. A motor bicycle according to claim 2, wherein said article accommodating box includes an additional article accommodating box located at a front portion thereof and having a bottom portion positioned above said cylinder heads.

4. A motor bicycle according to claim 3, wherein a battery is accommodated in said additional article accomodating box.

5. A motor bicycle according to claim 1, wherein said article accommodating box includes an additional article accommodating box located at a front portion thereof and having a bottom portion positioned above said cylinder heads.

6. A motor bicycle according to claim 5, wherein said cover for the article accommodating box is utilized for covering both said article accommodating box and said additional article accommodating box.

7. A motor bicycle according to claim 1, wherein a battery is arranged in front of said article accommodating box and behind said head pipe.

8. A motor bicycle according to claim 1, wherein said article accommodating box is provided with a heat insulation structure.

9. A motor bicycle according to claim 8, wherein said heat insulation structure is provided for said cover for covering said article accommodating box.

10. A motor bicycle according to claim 9, wherein said heat insulation structure comprises a hollow elastic member disposed upon a lower surface of said cover along a longitudinal direction thereof.

11. A motor bicycle according to claim 10, wherein said elastic member is provided with an inner hollow portion having air ports open to atmosphere at least at front and rear end portions thereof and connected to said air space so as to form flow said means for providing said air flow in said inner hollow portion.

12. A motor bicycle according to claim 9, wherein said heat insulation structure comprises a disc member disposed upon an upper surface of said cover, said disc member having an upper surface plated or coated with a solar heat reflecting material and having a lower surface from which a plurality of projections extend downwardly for defining a space between the lower surface of the disc member and the upper surface of the cover which serves as an air passage.

13. A motor bicycle according to claim 12, wherein said cover is provided with an opening formed in the upper portion thereof and said disc member is disposed so as to cover said opening of the cover.

14. A motor bicycle according to claim 1, wherein an inner surface of said cover is lined by an elastic lining member defining said inner plate such that defined between said cover and said lining for forming said air space.

15. A motor bicycle according to claim 9, wherein an upper surface of said cover is coated with a solar heat reflecting color coating.

16. A motor bicycle according to claim 9, wherein a tape of a solar heat reflecting color is bonded to an upper surface of said cover.

17. A motor bicycle according to claim 1, wherein said article accommodating box is provided with ventilation means for performing air ventilation of an interior portion of said article accommodating box.

18. A motor bicycle according to claim 17, wherein said ventilation means comprises a plate-like passage member which is secured to an inner wall of said article accommodating box so as to form an inner space serving as an air passage between said passage member and said inner wall of said article accommodating box, said inner space being provided with a rear air port open to said interior portion of said article accommodating box and a front air port formed in the inner wall of said article accommodating box so as to provide communication between atmosphere and said interior portion of said article accommodating box so as to provide communication between atmosphere and said interior portion of said article accommodating box.

19. A motor bicycle according to claim 18, wherein said opening is formed in at least one of the side walls of said article accommodating box.

20. A motor bicycle according to claim 18, wherein said opening is formed in a rear side wall of said article accommodating box.

21. A motor bicycle according to claim 18, wherein said front air port is positioned at a location beneath the location of said rear air port.

22. A motor bicycle according to claim 1, wherein said cover is secured to said article accommodating box at a rear portion thereof by a hinge means to be upwardly openable.

23. A motor bicycle according to claim 1, wherein said article accommodating box has an outer configuration adapted to accommodate a helmet with a top portion disposed upwardly and a front face portion disposed rearwardly in the article accommodating box.

24. A motor bicycle according to claim 23, wherein said cover is secured to said article accommodating box at a front portion thereof by a hinge means to be upwardly openable.

25. A motor bicycle as set forth in claim 1, wherein: said projection means comprises a plurality of ribs integrally formed upon said outer plate of said cover.

26. A motor bicycle as set forth in claim 1, wherein: said projection means comprises a plurality of ribs integrally formed upon said inner plate of said cover.

27. A motor bicycle according to claim 26, wherein said rib means and said inner plate are made of an elastic material.

28. A motor bicycle as set forth in claim 26, wherein: said ribs and said inner plate are made of an elastic material.

29. A motor bicycle as set forth in claim 1, wherein: said projection means comprises a plurality of bosses integrally formed upon said inner plate of said cover.

30. A motor bicycle, comprising:
a front wheel steered by means of a handle and through means of a head pipe;
a main body equipped with an engine unit located at a substantially central portion of said main body and including multiple cylinders having cylinder heads, and with an intake system extending rearwardly from said cylinders of said engine unit;
a seat for a rider located at a rearwardly upper portion of said main body;
a rear wheel disposed below said seat and driven by said engine unit; and
an article accommodating box provided with a cover to be opened and a locking means for locking said article accommodating box when said cover is disposed in a closed position, said article accommodating box being provided with a bottom portion extending rearwardly above and along said intake system and having a front portion extending upwardly at a rear upper portion of said cylinder heads, said cover being of a double wall structure comprising inner and outer cover and auxiliary cover members spaced apart with respect to each other so as to define an air flow space therebetween, and wherein further, inlet and outlet air ports, open to atmosphere, are provided at front and rear portions of said air flow space so as to define with said cover and auxiliary cover members an air flow passage through which air may flow as said motor bicycle travels along a predetermined path in a predetermined direction.

31. A motor bicycle according to claim 30, wherein said inner cover member is provided with an upper portion recessed inwardly along a longitudinal direction of said cover and said outer auxiliary cover member covers said recessed portion of said inner cover member so as to define said air flow space therebetween.

32. A motor bicycle according to claim 31, wherein said auxiliary cover member and said recessed portion of said inner cover member are separated by rib means which divide said space into a plurality of sections.

33. A motor bicycle, comprising:
a front wheel steered by means of a handle through means of a head pipe;
a main body equipped with an engine unit located at a substantially central portion of said main body and including multiple cylinders having cylinder heads, and with an intake system extending rearwardly from said cylinders of said engine unit;
a seat for a rider located at a rearwardly upper portion of said main body;
a rear wheel disposed below said seat and driven by said engine unit; and
an article accommodating box provided with a cover to be opened and a locking means for locking said article accommodating box when said cover is disposed in a closed position, said article accommodating box being provided with a bottom portion extending rearwardly above and along said intake system and having a front portion extending upwardly at a rear upper portion of said cylinder heads,
said locking means for locking said cover at said closed position with respect to said article accommodating box comprising a series circuit which includes a power source, an alarm means, a key sensor switch and a locking member provided for said cover and operatively connected to said key sensor switch, said key sensor switch including switch means for switching said key sensor switch ON when a key is removed from a key hole of said key sensor switch and for switching said key sensor switch OFF when said key is inserted into said key hole, and a lock sensor switch including lock sensor switch means for switching said lock sensor switch OFF when said cover is disposed at a closed locked position and for switching said lock sensor switch ON when said cover is disposed at an open unlocked position, whereby when both said key sensor switch and said lock sensor switch are ON, said alarm will be activated.

34. A motor bicycle, comprising:
a front wheel steered by means of a handle through means of a head pipe;
a main body equipped with an engine unit located at a substantially central portion of said main body and including multiple cylinders having cylinder heads, and with an intake system extending rearwardly from said cylinders of said engine unit;

a seat for a rider located at a rearwardly upper portion of said main body;

a rear wheel disposed below said seat and driven by said engine unit; and an article accommodating box provided with a cover to be opened and a locking means for locking said article accommodating box when said cover is disposed in a closed position, said article accommodating box being provided with a bottom portion extending rearwardly above and along said intake system and having a front portion extending upwardly at a rear upper portion of said cylinder heads, said main body having a front portion covered by means of a cowling which has a front portion provided with a window, said cowling further including a rear portion upon which a second article accommodating box is secured such that an opening of said second article accommodating box is in communication with said window, a cover for covering and uncovering said window is pivotably mounted upon said cowling so as to be upwardly openable and thereby provide access to said second article accommodating box, and a head lamp mounted upon said cover.

35. A motor bicyle acording to claim 34, wherein said second article accommodating box is positioned in a space defined by a rear surface of the cowling, the head pipe and an upper portion of a front fork of the main body.

36. A motor bicycle as set forth in claim 34, wherein:
said second article accommodating box comprises sufficient space for accommodating a rider's helmet.

37. A motor bicycle as set forth in claim 36, wherein:
said rider's helmet is disposed within said second article accommodating box with an open end of said helmet disposed toward said window and said cover; and said head lamp is mounted upon an inner surface of said cover so as to be disposed within a hollow interior portion of said helmet when said cover is disposed at its closed position covering said window.

* * * * *